US012719958B1

(12) United States Patent
Serena

(10) Patent No.: US 12,719,958 B1
(45) Date of Patent: Aug. 25, 2026

(54) APPARATUS AND METHOD FOR GENERATING A PERSONALIZED OUTPUT USING A USER PROFILE AND A USER INTERACTION

(71) Applicant: 1370092 Ontario Ltd., Waterdown (CA)

(72) Inventor: Nicole Serena, Waterdown (CA)

(73) Assignee: 1370092 Ontario Ltd., Watertown (CA)

( * ) Notice: Subject to any disclaimer, the term of this patent is extended or adjusted under 35 U.S.C. 154(b) by 0 days.

(21) Appl. No.: 19/227,067

(22) Filed: Jun. 3, 2025

(51) Int. Cl.
*G06F 15/16* (2006.01)
*H04L 67/306* (2022.01)

(52) U.S. Cl.
CPC .................................. *H04L 67/306* (2013.01)

(58) Field of Classification Search
CPC .................................................... H04L 67/306
USPC ......................................................... 709/201
See application file for complete search history.

(56) References Cited

U.S. PATENT DOCUMENTS

2005/0135596 A1 6/2005 Zhao
2018/0096440 A1 4/2018 Lopez et al.
2019/0287126 A1* 9/2019 Peng ....................... H04L 67/51
2020/0082314 A1* 3/2020 Crapis .............. G06Q 10/06311
2021/0227049 A1* 7/2021 Demiralp .............. H04L 67/535
2024/0069963 A1* 2/2024 Gharaybeh ............ G06N 3/044
2024/0324559 A1* 10/2024 Kwong .................. G16H 40/63
2025/0014089 A1* 1/2025 McClure ............... H04L 67/306

FOREIGN PATENT DOCUMENTS

IN 202421068227 A 6/2004
IN 202541013138 A 2/2005

* cited by examiner

*Primary Examiner* — Alan S Chou
(74) *Attorney, Agent, or Firm* — Caldwell LLC

(57) ABSTRACT

An apparatus and method for generating a personalized output as a function of a user profile and at least a user interaction. The apparatus includes at least a processor and a memory communicatively connected to the at least a processor configured to receive user data associated with a user, receive entity data associated with at least an entity, generate a user profile comprising the user data, wherein the user data comprises at least a geolocation datum, receive at least a user interaction, wherein the at least a user interaction comprises a first request of a plurality of requests, wherein the first request comprises a function datum and a temporal datum, and generate a first output of a plurality of outputs based on one or more of the user profile, the first request, and the entity data.

20 Claims, 10 Drawing Sheets

APPARATUS AND METHOD FOR GENERATING A PERSONALIZED OUTPUT USING A USER PROFILE AND A USER INTERACTION

FIELD OF THE INVENTION

The present invention generally relates to the field of a computing platform for optimization and feature learning processes. In particular, the present invention is directed to an apparatus and a method for generating a personalized output as a function of a user profile and at least a user interaction.

BACKGROUND

Many existing platforms rely on static or rule-based systems that do not adapt to individual user preferences, contextual inputs, or changing availability data in real time. These systems often fail to incorporate user feedback, dynamic inputs such as geolocation or timing, and cannot generate outputs that align with individual patterns or evolving needs across multiple providers, limiting the usefulness and responsiveness of the results delivered.

SUMMARY OF THE DISCLOSURE

In an aspect, an apparatus for generating a personalized output as a function of a user profile and at least a user interaction includes at least a processor and a memory communicatively connected to the at least a processor. The memory contains instructions configuring the processor to receive, using the at least a processor, user data associated with a user, receive entity data associated with at least an entity, wherein the at least an entity comprises a plurality of resources and the entity data comprises availability data, generate, using the at least a processor, a user profile comprising the user data, wherein the user data comprises at least a geolocation datum, receive, using a graphical user interface of a downstream device, at least a user interaction, wherein the at least a user interaction comprises a first request of a plurality of requests, wherein the first request comprises a function datum and a temporal datum, and generate, using at least an output model comprising a machine learning model trained using reinforcement learning, a first output of a plurality of outputs based on one or more of the user profile, the first request, and the entity data.

In another aspect, a method for generating a personalized output as a function of a user profile and at least a user interaction includes receiving, using at least a processor, user data associated with a user, receiving entity data associated with at least an entity, wherein the at least an entity comprises a plurality of resources and the entity data comprises availability data, generating, using the at least a processor, a user profile comprising the user data, wherein the user data comprises at least a geolocation datum, receiving, using a graphical user interface of a downstream device, at least a user interaction, wherein the at least a user interaction comprises a first request of a plurality of requests, wherein the first request comprises a function datum and a temporal datum, and generating, using at least an output model comprising a machine learning model trained using reinforcement learning, a first output of a plurality of outputs based on one or more of the user profile, the first request, and the entity data.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for generating a personalized output as a function of a user profile and at least a user interaction. The apparatus includes at least a computing device comprised of a processor and a memory communicatively connected to the processor. The memory instructs the processor to receive, using the at least a processor, user data associated with a user, receive entity data associated with at least an entity, wherein the at least an entity comprises a plurality of resources and the entity data comprises availability data, generate, using the at least a processor, a user profile comprising the user data, wherein the user data comprises at least a geolocation datum, receive, using a graphical user interface of a downstream device, at least a user interaction, wherein the at least a user interaction comprises a first request of a plurality of requests, wherein the first request comprises a function datum and a temporal datum, and generate, using at least an output model comprising a machine learning model trained using reinforcement learning, a first output of a plurality of outputs based on one or more of the user profile, the first request, and the entity data.

Figure 1:
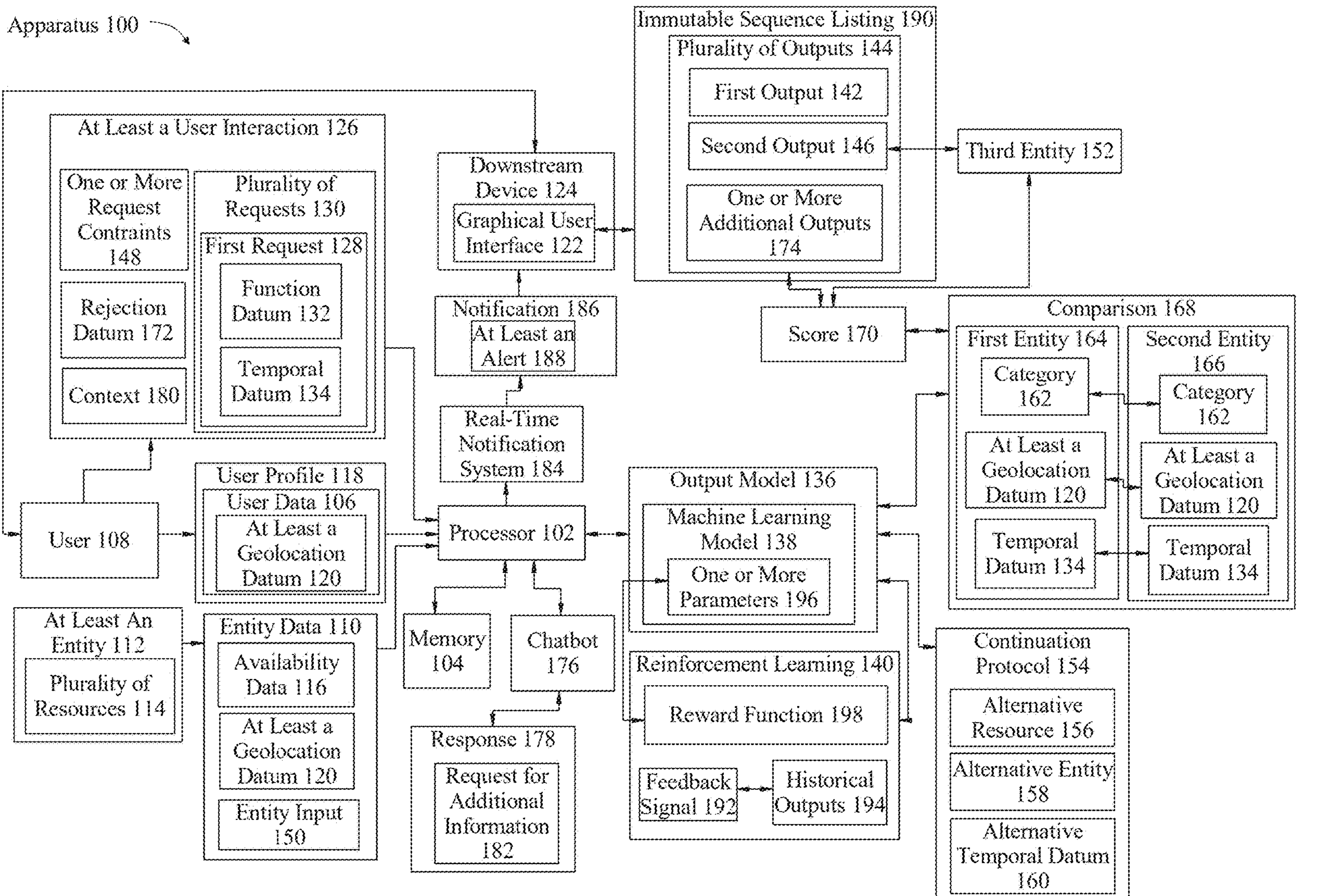
FIG. 1 is a block diagram of an apparatus for generating a personalized output as a function of a user profile and at least a user interaction.

Referring now to FIG. 1, an exemplary embodiment of apparatus 100 for generating a personalized output as a function of a user profile and at least a user interaction is illustrated. Apparatus 100 may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, the at least a processor 102 receives, using the at least a processor 102, user data 106 associated with a user 108. As used in this disclosure, "user data" is information associated with a user 108 that may be collected, stored, or processed to personalize the delivery of features within a system. The user data 106 may include, for example, demographic information such as the user's name, age, location, or contact details. The user data 106 may include behavioral information such as how frequently the user 108 engages with the system, the types of features they use most often, or their navigation patterns. The user data 106 may include preference information such as the user's chosen language, saved settings, or liked content. The user data 106 may also encompass historical interaction data, including prior queries, feedback provided, usage logs, or timestamps associated with certain activities, as well as metadata such as device type, IP address, or operating system. In some cases, the user data 106 may further include inferred or derived attributes based on analysis of direct interactions, such as content suggestions based on prior views or tailored recommendations based on past behavior.

Still referring to FIG. 1, the at least a processor 102 is configured to receive entity data 110 associated with at least an entity 112, wherein the at least an entity 112 comprises a plurality of resources and the entity data 110 comprises availability data 116. As used in this disclosure, "entity data" is information associated with a service provider that characterizes attributes of the service provider. For example, without limitation, the entity data 110 may include the service provider's offerings, its operations, it's resources, its interactions with customers, and the like. In an embodiment, the entity data 110 may include preference indicators, such as the ability for a service provider to decline a service request and optionally suggest an alternate provider based on unavailability, safety concerns, or past experience with a particular client. As used in this disclosure, "preference indicators" are data attributes that reflect conditions under which a service provider may deviate from standard service acceptance workflows. For example, without limitation, in some cases, the entity 112 may not be available due to scheduling conflicts, resource limitations, or operational downtime, and may wish to decline a request without penalty while facilitating continuity of service by recommending a trusted peer provider. In another example, the entity 112 may have experienced prior behavioral issues, payment disputes, boundary violations, and the like with a particular client, and may wish to decline future requests from that client based on internal risk assessments or business policy. In another non-limiting example, the entity 112 may operate under specific safety or compatibility criteria, such as requiring a secure location, certain equipment compatibility, or limiting service types under certain environmental or demographic conditions. The inclusion of preference indicators may help improve provider autonomy and safety, support compliance with service protocols, and enhance the overall quality and sustainability of service networks by routing requests toward better-fit alternatives when needed. In an embodiment, the entity data 110 may include structured or unstructured data relating to the provider's identity, business category, service offerings, operational hours, service regions, pricing, ratings, customer reviews, licensing information, availability, and other metadata that can support classification, indexing, or user-facing presentation of the service provider. For example, without limitation, for a laundry service, the entity data 110 may include types of services offered such as wash and fold or dry cleaning, turnaround times, delivery or pickup options, pricing information, and customer ratings. In an embodiment, for a grocery delivery service, the entity data 110 may include available product categories, delivery time slots, geographic service coverage, minimum order requirements, accepted payment methods, loyalty program participation, and the like. In another non-limiting example, for a mobile car wash service, the entity data 110 may include service tiers, use of eco-friendly products, vehicle identification based on license plate information, availability for on-demand scheduling, and options for fleet services. In an embodiment, for a childcare provider, the entity data 110 may include age groups served, licensing and certifications, staff qualifications, daily activity schedules, emergency response protocols, and capacity limits.

With continued reference to FIG. 1, as used in this disclosure, "entity" is a service provider that offers goods or services to users 108. As described herein, the terms "entity" and "provider" may be used interchangeably. In an embodiment, the at least an entity 112 may be represented within a system by a set of associated data or metadata that enables identification, classification, or interaction by users 108 or automated processes. For example, without limitation, an entity 112 may be a local dog walking company that allows users 108 to schedule walks for their pets. In an embodiment, an entity 112 may be a personal chef service that enables users 108 to book in-home dining experiences. For example, without limitation, an entity 112 may be a ride-hailing provider that offers on-demand transportation through a mobile application. In an embodiment, an entity 112 may be a home organization specialist that users 108 can book to help declutter and style interior spaces.

With continued reference to FIG. 1, as used in this disclosure, "resources" are individual persons who work at, are affiliated with, or perform tasks on behalf of a service provider. In an embodiment, the resource 114 may include a person who may be associated with a corresponding entity 112 within a system. Without limitation, the resource 114 may represent a specific human actor responsible for fulfilling a service transaction, executing a user request, or delivering a service in connection with the entity 112. For example, without limitation, a resource 114 may be a specific Uber driver who fulfills ride requests under the entity 112 Uber. In an embodiment, a resource 114 may be a particular food delivery person working under the entity 112 DoorDash who is assigned to deliver a user's order. For example, without limitation, a resource 114 may be a named home cleaner affiliated with a cleaning service entity 112, or a specific personal trainer available for booking through a fitness platform. In another embodiment, a resource 114 may be an individual dog walker affiliated with a pet care entity 112 who is assigned to walk a user's pet at a scheduled time. In an embodiment, a resource 114 may be a specific babysitter affiliated with a childcare entity 112 who is selected by a user for a requested time period. In another embodiment, a resource 114 may be a named home cleaner working under a home cleaning service provider, or a personal chef available for hire through a culinary service entity 112. In an embodiment, a resource 114 may be a dedicated massage therapist booked through a wellness service entity 112.

With continued reference to FIG. 1, As used in this disclosure, "availability data" is information indicating whether and when a resource 114 or entity 112 is able to provide a service> For example, without limitation, availability data 116 may include timeframes, geographic limitations, capacity, and/or other constraints that affect service scheduling, booking, or fulfillment. The availability data 116 may be dynamic or static and may be used to determine whether a particular service can be matched with a user request at a given time. In an embodiment, the availability data 116 for a specific Uber driver may include real-time status indicators such as online or offline, current location, and estimated time to arrival. In an embodiment, the availability data 116 for a food delivery person working with DoorDash may include their active delivery window, delivery radius, and number of orders they are able to accept within a given time period. In another non-limiting example, availability data 116 for a dog walker may include scheduled time slots, maximum number of dogs per walk, and walking regions they service. In an embodiment, availability data 116 for a babysitter may include calendar availability, age range of children they are comfortable caring for, and hours per day or week they are available to work. In another non-limiting example, the availability data 116 for a home cleaner may include preferred cleaning days, geographic reach, and service duration limits. In an embodiment, availability data 116 for a massage therapist may include appointment hours, session lengths offered, and current booking status.

With continued reference to FIG. 1, the entity data 110 may be stored in an entity profile. Without limitation, the at least a resource 114 may be associated with resource data of the entity data 110. Without limitation, the resource data may include a resource profile. As used in this disclosure, "entity profile" is a structured data representation that stores the entity data 110 associated with a particular service provider. The entity profile may include, without limitation, information such as the name of the service provider, business category, services offered, hours of operation, pricing, service regions, ratings, and other metadata useful for classification, display, or interaction within the system. The entity profile may be used by the system to facilitate discovery, scheduling, and transaction processing between users 108 and the entity 112. As used in this disclosure, "resource profile" is a structured data representation that stores the resource data associated with a particular resource 114 affiliated with an entity 112. The resource profile may include, without limitation, information such as the resource's 114 name, skills, availability data 116, certifications, assigned service areas, user ratings, and service preferences. The resource profile may enable the system to assign or recommend individual resources to user service requests in a manner aligned with the resource's 114 capabilities and availability. In an embodiment, both the entity profile and the resource profile may be configured and updated by the entity 112 or resource 114, respectively, through a graphical user interface 122 (GUI) platform. The GUI 122 platform may permit real-time modifications to service offerings, availability data 116, preferences, and operational parameters. In another non-limiting example, the system may dynamically update entity profiles and resource profiles based on user interactions 126, bookings, service completions, or other system events. The ability for entities and resources to directly interact with and update their profiles via the GUI 122 platform may allow for personalized control, increased accuracy, and improved service fulfillment across the platform. In another non-limiting example, the system may enable entities and resources to receive service requests submitted by users 108 and either accept or deny the requests. In an embodiment, the system may further allow the resource 114 or the entity 112 to propose alternative service windows or suggest other available vendors or service providers in the event of a conflict or unavailability. The GUI 122 platform may allow for real-time updates and interactions, enabling dynamic coordination between user demand and service fulfillment.

With continued reference to FIG. 1, in an embodiment, the system may provide separate, role-specific dashboards for the entity 112 and the resource 114, each accessible through a secure graphical user interface 122 platform. These dashboards may be dynamically tailored to the respective roles and permissions of the entity 112 and resource 114 and may enable real-time interaction with user requests, system events, and scheduling data. In another non-limiting example, the entity dashboard may allow the service provider to view and manage high-level operational data, including pending service requests, active bookings, real-time availability status of associated resources, service capacity thresholds, historical performance metrics, and customer feedback. The entity dashboard may further permit the entity 112 to configure default service parameters, broadcast availability windows, update pricing, pause or resume services, delegate requests to specific resources, or reassign tasks as needed. The system may also provide tools to communicate directly with users 108 or send automated updates based on status changes. In an embodiment, the resource dashboard may be customized for individual persons working on behalf of the entity 112 and may enable each resource 114 to view incoming service requests, accept or decline bookings, update their availability in real time, and adjust preferences such as service radius or supported task types. The resource dashboard may include a calendar view, route planning tools, push notifications for new requests, and a messaging interface for communicating with users 108 or the entity 112. In another non-limiting example, the system may provide automated recommendations or alerts on the resource dashboard, such as suggested time slots, optimized task scheduling, or alternative booking options if the resource 114 is unavailable. Without limitation, the dashboards may facilitate seamless interaction between users 108, resources, and entities by enabling rapid response to incoming requests, modification of service configurations, and visibility into the current state of service fulfillment. The dashboards may be accessible via web or mobile platforms and may support real-time synchronization with backend systems to reflect up-to-date information across all parties.

Still referring to FIG. 1, the at least a processor 102 generates, using the at least a processor 102, a user profile 118 comprising the user data 106, wherein the user data 106 comprises at least a geolocation datum 120. As used in this disclosure, a "user profile" is a structured collection of user data 106 that may represent the characteristics, preferences, behaviors, and historical interactions of a specific user within a system. The user profile 118 may include, for instance, without limitation, personal attributes such as the user's name, age, or location; user preferences such as language settings, notification 186 choices, or display themes; and behavioral indicators such as frequently used features, engagement frequency, or content consumption history. The user profile 118 may be dynamically updated over time as the user interacts with the system, allowing the system to adapt or personalize its responses or offerings accordingly. In some embodiments, a user profile 118 may also store inferred traits, such as user interests or intent, based on analytics or pattern recognition techniques applied to past user behavior.

With continued reference to FIG. 1, as used in this disclosure, a "geolocation datum" is a data point that represents the geographical position of a device, user, or object at a specific moment in time. The geolocation datum 120 may include coordinates such as latitude and longitude, and may optionally include additional context such as altitude, speed, direction, or timestamp. The geolocation datum 120 may be derived from sources such as GPS signals, Wi-Fi access points, cell tower triangulation, or IP address-based location estimates. In some embodiments, the geolocation datum 120 may be used to support location-based services, track movement patterns, enable geofencing, or tailor content delivery based on the user's physical position. The geolocation datum 120 may support location-based services in a variety of ways. For example, without limitation, the geolocation datum 120 may enable real-time navigation features, such as route guidance or traffic-aware directions. Without limitation, the geolocation datum 120 may support localized search results, such as surfacing nearby restaurants, gas stations, or service providers. In other instances, the geolocation datum 120 may trigger location-based notifications or promotions, for example without limitation, alerting the user to a discount available in a nearby store or sending a reminder when the user arrives at a specific destination. The geolocation datum 120 may further enable geotagging of content, localized weather updates, automatic time zone adjustments, and safety-related features such as emergency location sharing or roadside assistance dispatch. The geolocation datum 120 may allow systems to identify the current physical location of the user, enabling the system to offer services and content that are specifically relevant to the user's surroundings. For instance, without limitation, a food delivery application may use the geolocation datum 120 to display restaurants that are within the user's delivery range, rather than irrelevant options that are out of reach. Similarly, a ride-sharing app may use the geolocation datum 120 to connect the user with nearby drivers, reducing wait times and improving the accuracy of pick-up and drop-off estimates. This localization may increase the relevance and usability of the service, making the user experience smoother and more intuitive. In some cases, the geolocation datum 120 may help support dynamic content delivery based on local context. In an embodiment, the geolocation datum 120 associated with either the user, the entity 112, or the resource 114 may help support dynamic content delivery based on local context. This geolocation data may be continuously or periodically updated and leveraged by the system to tailor service availability, optimize request routing, and enhance user experience based on real-time environmental or geographic factors. For example, without limitation, the system may use geolocation data to surface nearby service providers relevant to the user's current location, such as recommending local dog walkers, home cleaners, or on-demand babysitters within a defined service radius. In another non-limiting example, the system may prioritize or rank entities based on proximity to the user or real-time availability of affiliated resources in the same area, thereby supporting faster fulfillment of user requests. In an embodiment, geolocation data may also enable the system to respond intelligently to regional disruptions, such as weather events, traffic conditions, or emergency alerts. For example, without limitation, in the event of a snowstorm or severe weather warning in a specific geographic region, the system may automatically suppress the availability of certain outdoor service categories such as lawn care or dog walking, and notify users 108 of potential scheduling interruptions. In another non-limiting example, the system may allow entities and resources in the affected region to proactively update their availability or reschedule service windows through the dashboard, while offering users 108 alternative providers operating in unaffected nearby areas. In an embodiment, geolocation data may further support compliance with localized service regulations, holidays, or curfews by filtering or modifying service offerings based on jurisdictional rules or local business hours. The ability to dynamically adjust content, availability, and recommendations based on real-time geographic context may improve system efficiency, reduce failed bookings, and enhance reliability and user trust.

Still referring to FIG. 1, the at least a processor 102 is configured to receive, using a graphical user interface 122 of a downstream device 124, at least a user interaction 126, wherein the at least a user interaction 126 comprises a first request 128 of a plurality of requests 130, wherein the first request 128 comprises a function datum 132 and a temporal datum 134. A "graphical user interface," as used herein, is a graphical form of user interface that allows users 108 to interact with electronic devices. In some embodiments, GUI 122 may include icons, menus, other visual indicators or representations (graphics), audio indicators such as primary notation, and display information and related user controls. A menu may contain a list of choices and may allow users 108 to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface 122. For example, links to decentralized platforms as described in this disclosure may be incorporated using icons. Using an icon may be a fast way to open documents, run programs etc. because clicking on them yields instant access.

With continued reference to FIG. 1, in an embodiment, the graphical user interface 122 and an event handler may operate together to enable seamless interaction between the user and the apparatus 100. The GUI 122 serves as the visual and interactive layer through which the user engages with the apparatus 100, presenting elements such as buttons, sliders, input fields, and informational displays. The event handler, on the other hand, functions as the underlying mechanism that monitors and responds to user interactions 126 with the GUI 122. For example, when a user clicks a button on the GUI 122 to request an explanation of a concept, the event handler may detect the click event, identify its context, and trigger the appropriate processes within the apparatus 100 to generate a tailored response. This interplay may ensure dynamic and responsive system behavior, as the event handler processes various input events such as clicks, taps, keystrokes, or voice commands, and relays these inputs to the relevant system components. The GUI 122 subsequently updates to reflect the system's responses, such as displaying output, modifying visual elements, or providing real-time feedback. Together, the GUI 122 and event handler create an intuitive and interactive experience, bridging user actions and system functionality to achieve efficient and personalized outcomes.

With continued reference to FIG. 1, an "event handler," as used in this disclosure, is a module, data structure, function, and/or routine that performs an action in response to an event. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements.

With continued reference to FIG. 1, as used in this disclosure, a "visual element" is a component or feature within a system, display, or interface that conveys information through visual means. In a non-limiting example, the visual element may include text, images, icons, shapes, colors, and/or other graphical components designed to be perceived by the user. In a non-limiting example, the visual element may aid in communication, navigation, and/or interaction with the system. Without limitation, the visual element may be used to enhance user experience, guide behavior, and/or represent data visually in an intuitive or informative way. A visual element may include data transmitted to display device, client device, and/or graphical user interface 122. In some embodiments, visual element may be interacted with. For example, visual element may include an interface, such as a button or menu. In some embodiments, visual element may be interacted with using a user device such as a smartphone, tablet, smartwatch, or computer.

With continued reference to FIG. 1, in an embodiment, the apparatus 100 and or the downstream device 124 may include a data structure. With continued reference to FIG. 1, as used in this disclosure, "data structure" is a way of organizing data represented in a specialized format on a computer configured such that the information can be effectively presented in a graphical user interface 122. In some cases, the data structure includes any input data. In some cases, the data structure contains data and/or rules used to visualize the graphical elements within a graphical user interface 122. In some cases, the data structure may include any data described in this disclosure. In some cases, the data structure may be configured to modify the graphical user interface 122, wherein data within the data structure may be represented visually by the graphical user interface 122. In some cases, the data structure may be continuously modified and/or updated by processor 102, wherein elements within graphical user interface 122 may be modified as a result. In some cases, processor 102 may be configured to transmit display device and or the downstream device 124 the data structure. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio, and microwave data and/or signals, combinations thereof, and the like, among others. Processor 102 may transmit the data described above to a database wherein the data may be accessed from the database. Processor 102 may further transmit the data above to a display device, client device, or another computing device. The data structure may serve as the organizational framework that stores, retrieves, and manages data required for processing events and updating the GUI 122. The data structure may act as a bridge between the user's input, captured by the event handler, and the output displayed on the GUI 122, ensuring that information is handled efficiently and accurately throughout the interaction. For example, without limitation, when a user interacts with a dropdown menu in the GUI 122 to select a topic, the event handler may capture this input and accesses a data structure, such as a dictionary or tree, that maps each topic to its associated resources or actions. The data structure may retrieve the relevant information such as, text explanations, videos, or interactive exercises, and passes it back to the event handler, which may then trigger the appropriate updates to the GUI 122, such as displaying the selected topic's content. In another embodiment, the data structure may also maintain the state of the system, tracking user progress, preferences, and session history. For instance, without limitation, a hash table may store user specific configurations, such as preferred learning styles or recent activity, which the event handler references when processing interactions. The GUI 122 may then dynamically adapt to display content aligned with these configurations. This integration may ensure that user inputs are seamlessly translated into meaningful system outputs, with the data structure enabling rapid access, consistency, and scalability throughout the process. As used in this disclosure, a "hash table" is a data structure that stores data in a way that allows for fast retrieval, insertion, and deletion of elements. The hash table may organize data into key-value pairs, where each key is unique and used to identify its corresponding value. A hash table may use a hash function to compute an index, or hash code, from the key, which determines where the key-value pair is stored within an array or list.

With continued reference to FIG. 1, as used in this disclosure, an "interactive element" is a component or feature within a graphical user interface 122 that allows users 108 to perform actions, provide input, or engage with the apparatus 100. Interactive elements may be designed to facilitate two-way communication between the user and the system, enabling the user to influence the behavior of the apparatus or obtain feedback in response to their actions. Examples of interactive elements may include buttons, dropdown menus, sliders, checkboxes, input fields, and hyperlinks. More advanced interactive elements may include drag-and-drop interfaces, interactive diagrams, or dynamically updating content areas that respond to user actions in real time. The interactive elements may enhance user engagement by providing intuitive and responsive mechanisms for interacting with the system. Interactive elements may operate by responding to user actions such as clicks, taps, swipes, or keyboard inputs, and triggering predefined system behaviors or processes. The execution of the interactive elements may require a combination of front-end and back-end technologies that work together to provide seamless functionality and user interaction 126. On the front end, technologies such as HTML and CSS may define the structure, appearance, and layout of the interactive elements, while JavaScript may enable dynamic functionality. For example, without limitation, JavaScript may detect when the user clicks a button and trigger actions or animations. Front-end frameworks like React, Angular, or Vue.js may further enhance development by offering reusable components and efficient rendering mechanisms. On the back end, the system may process the user's input, retrieve the necessary data, and communicate with the front end to provide an appropriate response. APIs may act as a bridge between the front end and back end, facilitating data transfer, such as sending a user's form submission to the server and retrieving processed results. Server-side logic, implemented using languages like Python, Java, or Node.js, may handle input processing and return relevant data, such as a user's profile or quiz questions. Additional supporting technologies may ensure the smooth operation of interactive elements. Event listeners, for instance, may continuously monitor for specific actions like mouse clicks or text entries, executing code when such events are detected. Efficient data structures, such as hash tables or dictionaries, may store interactive state data, such as user preferences or settings, for quick access and updates. Databases, including MySQL or MongoDB, may manage and store the data required for interactive features, such as user profiles 118 or historical activity. Communication technologies may also help maintain the responsiveness of interactive elements. AJAX (Asynchronous Javascript and XML) may allow the front end to update portions of a web page without requiring a full page reload, enhancing responsiveness. WebSockets may provide real-time interaction capabilities, such as live chats or collaborative tools, by enabling persistent communication between the client and the server. Without limitation, the apparatus 100 may include one or more APIs. As used in this disclosure, an "application programming interface (API)" is a set of defined protocols, tools, and methods that allow different software applications, systems, or components to communicate and interact with each other. An API may act as an intermediary that enables a client application, such as a user-facing app, to send requests to a server or service and receive the necessary responses, facilitating seamless integration and functionality across diverse systems.

As used in this disclosure, "downstream device" is a device that accesses and interacts with apparatus 100. For instance, and without limitation, downstream device 124 may include a remote device and/or apparatus 100. In a non-limiting embodiment, downstream device 124 may be consistent with a computing device as described in the entirety of this disclosure. Without limitation, the downstream device 124 may include a display device. As used in this disclosure, a "display device" refers to an electronic device that visually presents information to the entity 112. In some cases, display device may be configured to project or show visual content generated by computers, video devices, or other electronic mechanisms. In some cases, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as, textural, graphical, video among others, in either monochrome or color. Display device may include, but is not limited to, a smartphone, tablet, laptop, monitor, tablet, and the like. Display device may include a separate device that includes a transparent screen configured to display computer generated images and/or information. In some cases, display device may be configured to present a graphical user interface 122 to a user, wherein a user may interact with a GUI 122. In some cases, a user may view a GUI 122 through display. Additionally, or alternatively, processor 102 be connected to display device. In one or more embodiments, transmitting the plurality of outputs 144 may include displaying the plurality of outputs 144 at display device using a visual interface.

With continued reference to FIG. 1, As used in this disclosure, "user interaction" is an input received from a user through a graphical user interface 122. In an embodiment, the input may initiate, modify, and/or respond to a process or request within the system. Without limitation, the user interaction 126 may include selecting a service category, entering a location, submitting a scheduling request, modifying a booking, or engaging with system-generated content or suggestions. Without limitation, a user interaction 126 may include creating the user profile 118 by inputting user data 106, and the like. The user interaction 126 may be structured data or unstructured data, it may include text, audio, visuals, and the like. As used in this disclosure, "request" is a structured user-initiated data submission that indicates a desire to receive a service or task from a resource 114 or entity 112. Without limitation, the request may include parameters such as the desired service type, service location, time preferences, special instructions, contact details, and the like, and may be processed by the system to generate a match with one or more available resources or entities.

With continued reference to FIG. 1, as used in this disclosure, "function datum" is information that identifies the nature of the task the user is requesting. The function datum 132 may define the category 162 or type of work to be performed, such as dog walking, grocery delivery, home cleaning, childcare, ride-sharing, and the like, and may be used to filter, match, or route the request to suitable entities or resources. As used in this disclosure, "temporal datum" is time-based information associated with the request. The temporal datum 134 may include, without limitation, a specific requested date and time, a time range, recurrence frequency, service duration, scheduling constraints, and the like that inform when the requested function should occur. In a non-limiting example, the user may input a request for home cleaning services, the function datum 132, to be performed at 2:00 PM on a Saturday, the temporal datum

134, and the system may then identify one or more resources and/or entities capable of fulfilling that request within the specified parameters.

Still referring to FIG. 1, the at least a processor 102 is configured to generate, using at least an output model 136 comprising a machine learning model 138 trained using reinforcement learning 140, a first output 142 of a plurality of outputs 144 based on one or more of the user profile 118, the first request 128, and the entity data 110. As used in this disclosure, "output model" is a system-generated model that generates the plurality of outputs 144. In an embodiment, the output model 136 may generate recommended actions, service matches, suggested resources or entities, or updated system states. The output model 136 may be based on one or more inputs such as function data, temporal data, availability data 116, user preferences, historical data, geolocation data, real-time system conditions, and the like. In an embodiment, the output model 136 may include a ranked list of available service providers based on proximity, availability, and user-defined parameters. In another non-limiting example, the output model 136 may present a set of booking options including proposed time slots, alternate resources, or service variations based on resource capacity or scheduling conflicts. The output model 136 may be presented to the user through the graphical user interface 122 and may be continuously refined based on feedback, updated inputs, or evolving conditions within the system. Without limitation, the results generated by the output model 136 may be visually presented within the GUI 122 in a way that allows the user to review, compare, or select from among the system's suggestions. Continuing, the user may be shown, for example, a list of alternate time windows for pickup and delivery, substitute personnel, such as another available laundry specialist, or modified service options that may still satisfy the original request. The GUI 122 may display these results in a format that is interactive and/or informative, such as dropdowns, selectable cards, or auto-suggest prompts, and may update them in real-time as the system receives additional inputs, user selections, or changing availability conditions.

With continued reference to FIG. 1, as used in this disclosure, "reinforcement learning" is a type of machine learning in which an agent learns to make decisions based on interactions with an environment and feedback in the form of rewards or penalties. Without limitation, the agent may incrementally adjust its behavior to maximize cumulative rewards over time, allowing the system to learn optimal strategies or policies through trial and error. As used in this disclosure, "output" is a system-generated result produced in response to the user interaction 126. An output may include, without limitation, a recommendation, a service provider match, a time slot suggestion, a notification 186, a system action, other content intended for presentation to a user or for further processing within the system, and the like. In a non-limiting example, the output model 136 may evaluate multiple service providers in real time and determine an optimal match that balances provider availability, user preferences, and system efficiency. The reinforcement learning 140 component may enable the model to continuously improve its matching logic based on historical success rates, user satisfaction, and request fulfillment outcomes, thereby refining future outputs through adaptive feedback. Without limitation, this approach may enable the system to process and analyze vast and multidimensional datasets in real time, such as user behavior patterns, historical request fulfillment outcomes, availability fluctuations, service ratings, geographic constraints, and dynamic scheduling variables. Continuing, all of these data points interact in complex and nonlinear ways. The output model 136, when trained using reinforcement learning 140, may identify optimal actions or decisions that maximize efficiency, match quality, and user satisfaction across millions of changing inputs and scenarios. The output model 136 may adapt over time by learning from feedback, reward signals, and performance trends to refine its strategy and improve decision-making accuracy. Without limitation, this level of continuous adaptation at scale allows the system to dynamically allocate resources, predict service outcomes, and optimize request fulfillment with precision and speed. The result may include a more intelligent, responsive, and efficient platform that evolves in response to user needs and operational complexity.

With continued reference to FIG. 1, the output model 136 may leverage value-based reinforcement learning. As used in this disclosure, "value-based reinforcement learning" is a learning approach in which an agent seeks to estimate the value of being in a given state or taking a particular action in a state, with the goal of maximizing cumulative future rewards. Continuing, the agent may not learn the policy directly; instead, it may infer the best actions by selecting those that lead to the highest expected value. Algorithms such as Q-learning and Deep Q-Networks (DQN) are non-limiting examples of value-based methods. In an embodiment, the output model 136 may estimate the potential utility or reward of offering certain booking outcomes, such as faster delivery times or higher user satisfaction, and prioritize those actions that maximize long-term performance. For example, if recommending a certain driver or pickup time consistently results in successful outcomes, the output model 136 may learn to increase the likelihood of presenting that option in future interactions. This learning process may occur through algorithms such as Q-learning or Deep Q-Networks (DQN), which may update internal value estimates based on reward signals derived from user behavior and operational feedback.

With continued reference to FIG. 1, in another embodiment, policy-based reinforcement learning may be employed to directly optimize the model's decision-making strategy. As used in this disclosure, "policy-based reinforcement learning" is a learning approach in which the agent may directly learn a policy that maps states to actions without explicitly computing value functions. The policy may be stochastic or deterministic and may be optimized to maximize expected rewards over time. Non-limiting examples of policy-based methods include the REINFORCE algorithm and Actor-Critic models, where a policy and a value function may be learned concurrently. Rather than computing value estimates for each possible action, the system may learn a probability distribution over possible actions using methods such as REINFORCE or Actor-Critic algorithms. This may allow the output model 136 to dynamically tailor booking recommendations to different user profiles or service scenarios. For instance, without limitation the output model 136 may learn to propose different time slots depending on whether the user tends to accept early pickups or prefers specific personnel. Continuing, such policy tuning may lead to smoother and more flexible adaptation across diverse scheduling environments.

With continued reference to FIG. 1, the output model 136 may include model-based reinforcement learning. As used in this disclosure, "model-based reinforcement learning" is a learning approach in which the agent may create and utilize an internal model of the environment to simulate outcomes, predict state transitions, and make informed decisions based on those predictions. This model may be learned from experience or predefined and may allow the agent to plan ahead by evaluating the effects of actions before execution. Model-based learning may lead to improved sample efficiency and more informed policy development. In an embodiment, the such as anticipated resource usage, traffic delays, or failure likelihoods, to simulate the outcomes of possible actions before choosing one. This predictive capability may allow the system to not only react to current inputs but also proactively manage capacity and preempt conflicts before they occur. Continuing, by simulating different booking paths, the model may identify optimal allocation strategies that account for both short-term constraints and long-term efficiency, all while adjusting based on evolving user demand patterns and operational feedback loops.

With continued reference to FIG. 1, the output model 136 may predict a temporal interval associated with the first request 128 based on the at least a geolocation datum 120 of the at least an entity 112 and historic temporal intervals associated with the at least an entity 112 and the function datum 132. As used in this disclosure, a "temporal interval" is a duration of time between two events. For example, without limitation, the temporal interval may include the time between initiation and completion of a service request. In some embodiments, the temporal interval may represent a predicted turnaround time for fulfilling a particular user request. Without limitation, this prediction may allow the apparatus 100 to estimate a more accurate turnaround time for fulfilling the first request 128. For example, without limitation, if the function datum 132 indicates a request 128 for laundry pickup and the entity 112 is located 1.2 miles from the address of the user 108, the output model 136 may analyze past turnaround times for similar laundry services performed by that provider or similar providers in that area. If the historical data show that laundry pickups typically take 45 minutes from assignment to completion in that zone, the output model 136 may predict a similar temporal interval. In another non-limiting example, if the function datum 132 corresponds to a delivery service and the provider is currently located across town during peak traffic hours, the geolocation datum 120 and historic temporal intervals for similar delivery tasks may lead the output model 136 to predict a longer turnaround time, such as 90 minutes. Conversely, if the provider is nearby and the function datum 132 reflects a simple task like document pickup, the output model 136 may assign a shorter predicted turnaround time, such as 20 minutes.

With continued reference to FIG. 1, further may include generating, using the at least an output model 136, a second output 146 as a function of one or more request constraints 148 and the user profile 118. As used in this disclosure, "second output" is a subsequent system-generated result produced by the output model 136. In an embodiment, the second output 146 may be derived based on additional or refined inputs, such as request constraints 148 and user profile 118 data. The second output 146 may represent a refined recommendation, an alternative service provider, a modified time slot, or other system action or content that reflects further processing of the original request in light of limiting conditions or user-specific factors. As used in this disclosure, "request constraints" are limitations defined by the user or system that restrict or guide how a request may be fulfilled. Without limitation, the request constraints 148 may include budget limitations, preferred time windows, location boundaries, required certifications, provider gender preferences, task duration limits, or maximum travel distance. Continuing, the request constraints 148 may influence how the system selects or prioritizes available entities or resources when generating outputs. In an embodiment, the second output 146 may offer an optimized match that satisfies the request constraints 148 while aligning with user preferences, thereby increasing the likelihood of successful fulfillment. For example, without limitation, a user may submit a request for a dog walker on Monday at 9:00 AM. The system may generate a first output 142 using the output model 136, which identifies that Sally, a resource 114 affiliated with the entity 112 DogCity and located in the user's neighborhood, is available to walk the dog at the requested time. The user may view this first output 142 through the graphical user interface 122 and elect to deny or decline the suggestion. In response, the system may prompt the user for additional feedback, such as whether the denial was due to pricing, past experience, location, or personal preference. In an embodiment, the system may use that information to refine its output model 136 and generate a second output 146. Alternatively, the system may automatically generate the second output 146 without requiring additional input by presenting the user with a new list of suggested dog walkers. This second output 146 may include other available resources along with associated information such as their proximity to the user, hourly rates, user ratings, and experience level. The second output 146 may offer a range of options that better align with the user's preferences or constraints, allowing the user to select an alternative that is more suitable.

With continued reference to FIG. 1, further may include generating the second output 146 as a function of an entity input 150, wherein the second output 146 is associated with a third entity 152. As used in this disclosure, "entity input" is information provided by a service provider or resource 114 affiliated with the service provider. In an embodiment, the entity input 150 may influence the generation of subsequent system outputs. The entity input 150 may include, without limitation, suggested alternate resources and/or preferred replacements. For example, without limitation, a user may regularly request grocery shopping services from John, a resource 114 affiliated with the entity GroceryOnDemand. If John is unavailable for a specific time window requested by the user, John may submit an entity input 150 through the dashboard recommending Chris, a coworker who shares similar work ethic, diligence, and familiarity with the user's preferences. In an embodiment, the system may incorporate John's input and generate a second output 146 identifying Chris as the suggested alternative. The second output 146 may be associated with a third entity 152 if, for example, Chris is affiliated with a different but compatible service provider. This recommendation may preserve service continuity and maintain a consistent level of quality, while reflecting both system intelligence and human judgment through integration of the entity input 150. This referral approach may introduce a personalized and context-aware mechanism into the decision-making process of the system, which adds both operational efficiency and human-level nuance. For the customer, this approach may help maintain service continuity and preserve trust in the platform. The user may receive recommendations from a familiar and reliable provider, which may reduce decision fatigue and offer greater confidence when considering an alternative option. This may also support quicker rebooking, closer alignment with the user's expectations, and a lower likelihood of an unsatisfactory service experience. For the entity 112, this method may enhance the brand's reputation by helping uphold a high level of service, even when internal availability is limited. Referral-based logic may encourage positive affiliations between compatible entities and may support cooperative relationships that expand the entity 112 service reach or provide reliable backup coverage. For the resource 114, this functionality may offer a way to maintain positive rapport with clients during times of unavailability. Without limitation, by recommending a trusted colleague, the resource 114 may reinforce their reliability and standing with both the user and the broader system. This may lead to reciprocal referrals, improved client retention, and participation in a more collaborative and balanced service network.

With continued reference to FIG. 1, further may include generating, using the at least an output model 136, a continuation protocol 154, wherein the continuation protocol 154 comprises one or more of an alternative resource 156, an alternative entity 158, and an alternative temporal datum 160 associated with the function of the first request 128. As used in this disclosure, "continuation protocol" is a set of one or more system-generated alternatives designed to support the continued fulfillment of a user's request when the originally proposed option is not accepted, unavailable, or otherwise interrupted. The continuation protocol 154 may be generated using the output model 136 and may include one or more substitute options relating to the function of the original request. As used in this disclosure, "alternative resource" is a different individual person, distinct from the originally proposed resource 114, who is capable of fulfilling the same function datum 132 associated with the request. The alternative resource 156 may be affiliated with the same or a different entity and may meet similar criteria in terms of experience, location, availability, and user preferences. As used in this disclosure, "alternative entity" is a different service provider or organization, distinct from the originally proposed entity 112, that offers the same or a substantially equivalent function as specified in the user's request. The alternative entity may be selected based on availability, geographic proximity, pricing, ratings, or prior user engagement. As used in this disclosure, "alternative temporal datum" is a different time-related parameter from the one originally requested. This may include a different time slot, a nearby time window, a later or earlier date, or a recurring schedule that aligns with system or resource 114 availability.

With continued reference to FIG. 1, for example, without limitation, if a user requests a dog walker for Monday at 9:00 AM and the originally suggested resource 114 is unavailable or declined by the user, the system may generate a continuation protocol 154. In an embodiment, the system may identify a different dog walker, the alternative resource 156, affiliated with the same company. Additionally and/or alternatively, the system may suggest a different pet care company, alternative entity 158, that offers a similar service. In another non-limiting example, the system may propose a different time, such as Monday at 11:00 AM, the alternative temporal datum 160, to accommodate limited availability. The continuation protocol 154 may be surfaced to the user in real time to ensure seamless service re-engagement with minimal friction. In another non-limiting example, the user may submit a request for a math tutor on Thursday at 4:00 PM. The system may initially generate a first output 142 identifying Alex, a resource 114 affiliated with the entity 112 StudySmart Tutors, as available at the requested time. Continuing, if Alex is no longer available or the user declines the recommendation, the system may generate a continuation protocol 154. In an embodiment, the continuation protocol 154 may include Taylor, an alternative resource 156 who also specializes in math tutoring and is available at the requested time, possibly within the same entity 112 or a different tutoring platform. In another non-limiting example, the system may identify LearnPro Tutoring, an alternative entity 158 that offers comparable math tutoring services, along with a set of available tutors. The system may also suggest an alternative temporal datum 160, such as Thursday at 6:00 PM or Friday at 4:00 PM, if no matching tutor is available at the originally requested time. The continuation protocol 154 may allow the user to seamlessly review and select from alternative options without restarting the request process.

With continued reference to FIG. 1, the at least a processor 102 may be configured to generate the first output 142 by extracting, using the at least an output model 136, a category 162 corresponding to the function of the at least an entity 112 and the temporal datum 134 of the first request 128, comparing, using the at least an output model 136, a first entity 164 with a second entity 166 of the at least an entity 112 based on the category 162, the temporal datum 134 corresponding to the availability datum associated each entity 112 of the at least an entity 112, and the at least a geolocation datum 120 of the user profile 118 corresponding to the at least a geolocation datum 120 of the at least an entity 112, generating, using the at least an output model 136, a score 170 for the first entity 164 and the second entity 166 as a function of a comparison 168 and generating, the first output 142 as a function of the score 170. In an embodiment, the score 170 for an entity 112 may be generated by the system, by the user, or by a combination of both. The score 170 may be dynamically influenced not only by static factors such as availability, proximity, and service category 162 but also by historical interaction data, including user preferences and prior outcomes. In another non-limiting example, the system may generate the score 170 automatically by analyzing behavioral feedback signals 192. If a user previously accepted a match with a particular entity 112 under similar conditions, such as the same category 162, location, and time window, the system may infer a positive match quality and assign a higher score 170 to that entity 112 in future comparisons 168. Conversely, if the user has consistently denied or rejected a specific entity 112, even when the entity 112 meets all standard criteria, the system may apply a penalty to that entity's 112 score 170 to reflect likely user dissatisfaction. In an embodiment, the user may also have the ability to directly rate or score 170 entities through the graphical user interface 122. These user-generated scores 170 may reflect subjective experiences such as timeliness, professionalism, or overall satisfaction and may be used by the system to refine output generation. The output model 136 may incorporate both system-generated feedback and user-generated input into a blended scoring algorithm that weighs past acceptance patterns, denial reasons, rating values, and request-specific variables. Continuing, the hybrid approach allows the score 170 to evolve based on actual usage behavior, increasing personalization and relevance over time. It may help the system more accurately anticipate user preferences and generate outputs that are more likely to be accepted, thereby improving efficiency, user satisfaction, and overall platform performance. The system may use a combination of technologies to support intelligent decision-making and personalized output generation. Machine learning frameworks such as TensorFlow or PyTorch may be used to train the output model 136, including models that use reinforcement learning 140 to adapt based on user interactions 126. For example, without limitation, if a user consistently accepts matches with Entity A but denies Entity B, the model may learn to prioritize Entity A for future requests. The system may rely on recommendation engines that use collaborative filtering or content-based filtering to suggest entities or resources based on user preferences or behavior. Real-time data processing tools such as Apache Kafka or Apache Spark may help the system analyze incoming requests, availability data 116, and geolocation in real time to support fast comparisons. Cloud-based infrastructure such as AWS, Google Cloud, or Azure may host the system's backend, allowing for scalable storage of user profiles 118, request history, and feedback. For example, user ratings may be stored and retrieved to update an entity's 112 score 170 dynamically. A graphical user interface 122 built with front-end technologies such as React or Vue may allow users 108 and entities to interact with the platform, update availability, submit referrals, or accept and deny service matches.

With continued reference to FIG. 1, as used in this disclosure, "category" is a classification label that defines the domain of service associated with an entity 112 or request. The category 162 may reflect the function datum 132 submitted by the user and may include, without limitation, tutoring, grocery delivery, pet care, transportation, home cleaning, or any other domain of service offered within the system. As used in this disclosure, "score" is a numerical value that represents the suitability of a particular entity 112 or resource 114 in fulfilling the request. The score 170 may be calculated based on a weighted combination of parameters such as availability, proximity, ratings, historical performance, service match, or user preference alignment. As used in this disclosure, "comparison" is an analytical evaluation conducted by the system in which two or more entities are assessed relative to each other based on one or more criteria. In an embodiment, the criteria may include category 162 relevance, scheduling compatibility, geographic proximity, service quality, the scores 170, and the like. The comparison 168 may be performed using the output model 136 to determine which entity 112 is more likely to fulfill the user's request successfully.

With continued reference to FIG. 1, in an embodiment, generating the first output 142 may include identifying, using the at least a processor 102, the category 162 by parsing the function datum 132 of the request and mapping it to a predefined classification. Next, the system may filter all available entities offering services in that category 162 and cross-reference their availability data 116 with the requested temporal datum 134. The system may then calculate proximity by evaluating the user's geolocation against the service areas of the filtered entities. Using this information, the output model 136 may conduct a comparison 168 of two or more entities and generate a score 170 for each, where the score 170 reflects how well each entity 112 satisfies the combination of time availability, location relevance, and service category 162. In another non-limiting example, the system may determine that both Entity A and Entity B offer dog walking services, the category 162, but only Entity A is available at the requested time and within one mile of the user. Based on the comparison 168, the system may assign a higher score 170 to Entity A and generate the first output 142 recommending Entity A as the preferred service provider.

With continued reference to FIG. 1, further may include generating, using the at least an output model 136, one or more additional outputs 174 as a function of a rejection datum 172 of the at least a user interaction 126, wherein the rejection datum 172 is in response to the first output 142. As used in this disclosure, "additional outputs" are one or more supplementary options generated by the system in response to a user request. In an embodiment, the one or more additional outputs 174 may be presented to the user as a list or group of selectable alternatives. The one or more additional outputs 174 may outputs may be surfaced through the graphical user interface 122 and may include variations such as different service providers, resources, time slots, or pricing options. For example, without limitation, if a user requests a math tutor on Thursday at 4:00 PM, the additional outputs 174 may include three available tutors, each with different hourly rates, ratings, and availability windows, allowing the user to select the most suitable match. As used in this disclosure, "rejection datum" is information indicating that a user has declined a system-generated output. The rejection datum 172 may be captured through various user interactions 126, including explicit and implicit feedback. For example, without limitation, the user dashboard may display a thumbs up or thumbs down icon next to each recommended match, allowing the user to quickly indicate approval or rejection. In an embodiment, the user may type "no" in a response field or select a "Not Interested" button. In another non-limiting example, the system may support audio input, allowing the user to say "no" to decline an option, which may be recorded as a rejection datum 172.

With continued reference to FIG. 1, further may include a chatbot 176, wherein the chatbot 176 receives one or more of the user data 106 and the at least a user interaction 126 and generates a response 178 based on a context 180 of the at least a user interaction 126, wherein the response 178 provides a request for additional information 182. As used in this disclosure, "response" is a system-generated output that is generated in reaction to a user interaction 126. For example, the response 178 may take the form of a message, prompt, action, and the like. The response 178 may include, without limitation, a clarification question, a follow-up suggestion, a confirmation, or a request for further input to improve or complete a transaction. As used in this disclosure, "context" is the set of conditions associated with a user interaction 126 at a given point in time. The context 180 may include, without limitation, the content of the user's request, the function datum 132, the temporal datum 134, the user profile 118, historical behavior, geolocation data, or prior system responses. The context 180 enables the system to interpret user input accurately and respond in a relevant and informed manner. In an embodiment, a user may request a grocery delivery service for a specific time, and the chatbot 176 may detect from the context 180 that the user denied the first output 142 generated by the system. In response 178, the chatbot 176 may generate a message such as, "I noticed that option wasn't right, would you prefer someone with a lower delivery fee, or is the timing not ideal?" In another non-limiting example, if the user requests a tutor and rejects the first suggestion, the chatbot 176 may respond with, "Would you like someone with more experience, or should I look at other available times?" The chatbot 176 may personalize these responses 178 by incorporating stored user data 106, such as past preferences or rejection patterns, and may prompt the user to clarify their needs. Continuing, this exchange may allow the system to refine its next output or initiate a continuation protocol 154 with more accurate parameters. The chatbot 176 may operate through text, voice, or graphical prompts and may serve as an interactive layer that keeps the service discovery process efficient, conversational, and user-centered. Please refer to FIG. 6 for more details on the chatbot 176.

With continued reference to FIG. 1, further may include a real-time notification system, wherein the real-time notification system 184 comprises transmitting, using the at least a processor 102, a notification to the downstream device 124, wherein the notification comprises at least an alert 188 corresponding to historical user interactions. As used in this disclosure, "real-time notification system" is a component configured to transmit messages to a user's downstream device 124 with minimal delay. In an embodiments, the real-time notification system 184 may include haptic feedback, visual messages, and the like. In an embodiment, the real-time notification system 184 may transmit the notification 186 in response to relevant system events, user interactions 126, changes in system state, and the like. The real-time notification system 184 may support continuous communication between the platform and the user, ensuring that users 108 receive timely and contextually appropriate information. As used in this disclosure, "notification" is a message or prompt transmitted to the user's device that conveys system-generated information intended to inform, confirm, request, or guide user action. Notifications may appear as banners, push alerts, modal pop-ups, in-app messages, sound/vibration signals, and the like, and may be triggered by user activity, system updates, or personalized rules. As used in this disclosure, "alert" is a type of notification 186 that draws attention to a specific condition, event, or action. In an embodiment, the alert 188 may require user review or response. The alert 188 may include, without limitation, availability changes, booking reminders, service disruptions, or updates related to prior user behavior. As used in this disclosure, "historical user interactions" are past actions made by the user in connection with the platform. Without limitation historical user interactions may include accepted or denied service matches, preferences selected, prior ratings, previously scheduled appointments, time and location patterns associated with past requests, and the like. For example, without limitation, if a user frequently schedules a home cleaner every other Saturday at 10:00 AM, the real-time notification system 184 may transmit an alert 188 two days prior to that expected time, reminding the user to confirm or modify the upcoming service. In an embodiment, if the user has previously denied matches with Entity A for grocery shopping but accepted matches with Entity B, the system may issue an alert 188 notifying the user that Entity B has just become available within their preferred delivery window. In another non-limiting example, if a user typically prefers evening tutoring sessions and has not submitted a new request for the upcoming week, the system may transmit a notification 186 prompting them with time slot suggestions based on their historical behavior. Without limitation, these real-time alerts may improve user engagement, streamline decision-making, and reduce the likelihood of missed services by leveraging historical user interactions to proactively surface relevant and timely information.

With continued reference to FIG. 1, further may include an immutable sequence listing 190, wherein the immutable sequence listing 190 may include logging the at least a user interaction 126 corresponding to the plurality of outputs 144. The immutable sequence listing 190 is a secure and tamper-resistant log that chronologically records user interactions 126 with system-generated outputs. Each entry in the listing may represent a discrete event, such as when a user receives an output, accepts or rejects a suggestion, selects an alternative, provides feedback, submits a request for more information, and the like. Once logged, each entry may be stored in an unalterable format that preserves the original content and timestamp of the interaction, ensuring historical accuracy and accountability. This type of logging may be critically important for transparency, troubleshooting, performance optimization, and personalization. For example, without limitation, if a user disputes a booking or wants to revisit a previous suggestion, the immutable sequence listing 190 may allow the system or support personnel to reference a definitive record of what was shown, when it was shown, and how the user responded. In another non-limiting example, the system may analyze patterns across the immutable log to improve model performance, detect unusual behavior, or validate that specific actions were generated as expected. The immutability of the sequence listing may support auditability, compliance, and data integrity, particularly in use cases involving regulated services, payments, or sensitive scheduling scenarios. Without limitation, by maintaining a trusted and uneditable history of interactions, the system may ensure reliability for users 108, entities, and platform operators alike. Please refer to FIG. 7 for more details on the immutable sequence listing 190.

With continued reference to FIG. 1, wherein training the machine learning model 138 using reinforcement learning 140 may include receiving, by the machine learning model 138, a feedback signal 192 corresponding to historical outputs 194 and adjusting, by the machine learning model 138, one or more parameters 196 of the machine learning model 138 based on a reward function 198, wherein the reward function 198 optimizes alignment between the plurality of outputs 144 associated with the feedback signal 192. As used in this disclosure, "feedback signal" is a data point or set of data points that reflect the outcome of a previously generated system output. The feedback signal 192 may include, without limitation, user actions such as accepting or rejecting a recommendation, completing or canceling a service, providing a rating, offering qualitative feedback, and the like. The feedback signal 192 may serve as an indication of how well the system met the user's needs or expectations. As used in this disclosure, "historical outputs" are past system-generated outputs that were presented to a user. In an embodiment, the historical outputs 194 may include recommendations, responses, or other communications with the user in connection with a request. The historical outputs 194 may include recommended entities, resources, time slots, pricing options, other selectable result, and the like, and are stored for use in training, auditing, or pattern recognition. As used in this disclosure, "parameters" are internal adjustable values of a machine learning model 138 that influence how the model processes inputs and generates outputs. The one or more parameters 196 may include weights, thresholds, decision boundaries, and the like, that are refined during training to improve model performance. As used in this disclosure, "reward function" is a mathematical formula that evaluates the quality of an output in reinforcement learning 140. The reward function 198 may assign a numerical value based on how closely a given output aligns with a desired outcome, and it guides the model in learning to produce better results over time. For example, without limitation, if the system previously recommended three dog walkers for Monday at 9:00 AM and the user consistently selected the second option, the feedback signal 192 may reflect that outcome. The machine learning model 138 may receive this feedback and use the reward function 198 to assign a higher reward value to outputs that present similar types of providers earlier in the ranked list. The model may then adjust its parameters 196 to increase the likelihood that future users 108 with similar profiles or request conditions receive outputs that resemble the historically successful choice, thereby improving alignment between the generated outputs and user preferences.

With continued reference to FIG. 1, in an embodiment, determining similar types of providers may include analyzing multiple provider attributes of the entity data 110, such as service ratings, response time, geographic proximity, availability during the requested time window, historical user satisfaction scores, specialization like laundry pickup, pet care, or delivery services, and user demographics they frequently serve. The output model 136 may use these features to create vectorized representations or embeddings for each provider and may calculate similarity using distance metrics such as cosine similarity or learned attention weights within a neural architecture. When a provider receives a high reward signal, the output model 136 may identify other providers with comparable embeddings or attribute patterns and adjust its parameters 196 to elevate their ranking in future outputs. Without limitation, this process may allow the apparatus 100 to not only prioritize the same provider for repeat users but also surface providers with a similar service profile for new or comparable users 108 who demonstrate overlapping preferences or request characteristics. For instance, if one user 108 consistently selects high-rated providers who offer early morning laundry service within a 2-mile radius, the apparatus 100 may generalize this preference and apply it to other users 108 who place similar requests 130, even if the original provider is unavailable. The output model 136 may therefore refine its strategy by adjusting its internal weights or scoring functions to favor outputs 144 that historically led to successful engagement, thereby improving both personalization and the efficiency of request fulfillment. This adaptive process may be reinforced through continuous learning, where the performance of the output model 136 is monitored based on user interactions 126 over time. As the output model 136 observes repeated patterns of acceptance or rejection across different users and contexts, it may fine-tune how provider similarity is weighted in its ranking mechanism. The result may include a system that intelligently generalizes from individual decisions to population-level trends while still tailoring suggestions to the specific context of each request 130.

With continued reference to FIG. 1, the use of reinforcement learning 140 in training the machine learning model 138 may significantly enhance the system's ability to generate context-aware, user-centered outputs over time. Unlike traditional rule-based or supervised machine learning systems that rely on static datasets and fixed logic, the reinforcement learning-trained model 140 may learn dynamically from real-world interactions. In particular, the machine learning model 138 may adapt based on a feedback signal 192 corresponding to historical outputs 194, such as user actions and responses to previously recommended booking options, time slots, or service providers. Continuing, reinforcement learning may offer several distinct advantages that are especially useful in the context of intelligent scheduling, resource allocation, and recommendation systems. For example, without limitation, the use of a reward function 198 may allow the model 138 to optimize for behavioral alignment favoring booking suggestions that have historically led to completed transactions, positive ratings, or low cancellation rates. This ability to continuously refine the parameters 196 of the model based on real-time user engagement data may result in a more intelligent and adaptive platform that outperforms conventional approaches that rely solely on static preferences or one-time feedback. Without limitation, by learning from patterns in which users accept or reject recommendations, reinforcement learning 140 may support the output model 136 in identifying subtle behavioral trends that may not be captured in hard-coded rules. For instance, without limitation, if a user repeatedly books early-morning laundry pickups but only with a certain provider, the apparatus 100 may learn to present that provider earlier in the list of suggestions at those times. Over time, the output model 136 may learn to weigh certain combinations of resource availability, timing, and provider preference more heavily, resulting in smarter prioritization and increased conversion rates. This type of fine-grained personalization may not be feasible with traditional supervised models alone, which typically require labeled datasets and manual retraining. Additionally, reinforcement learning 140 may enable the apparatus 100 to better handle dynamic environments. Continuing, because resource availability, user behavior, and system constraints may all fluctuate over time, the ability of the output model 136 to adjust its strategy in response to changing conditions may lead to greater efficiency and reliability. This adaptability is especially beneficial in use cases involving high-volume service scheduling, where minimizing wait times and maximizing user satisfaction are critical to platform performance. For example, without limitation, when a preferred provider becomes unavailable, the apparatus 100 may proactively recommend the most contextually suitable alternative based on what has historically resulted in successful outcomes.

In an embodiment the reward function 198 assigns a numerical reward value to the first output 142 based on alignment between the first output 142 and the feedback signal 192 corresponding to one or more historical outputs 194. For example, without limitation, the apparatus 100 may evaluate the effectiveness or success of the first output 142, such as a recommended time slot, provider, or service option, by comparing it to outcomes from similar past outputs 144. The feedback signal 192 may reflect user interactions 126 or system events, such as whether a user accepted or rejected a recommendation, completed or canceled a scheduled service, or provided a satisfaction rating. For example, without limitation, if the first output 142 includes a suggested laundry pickup at 8:00 AM with a specific provider, and historical outputs 194 show that users consistently accepted similar recommendations and completed those services, the reward function 198 may assign a high numerical value to that output. Conversely, if a certain provider or time slot is frequently associated with cancellations or low ratings, the reward function 198 may assign a lower value. Over time, these reward values may guide the machine learning model 138 to adjust its parameters 196 in a way that increases the likelihood of producing outputs 144 that are more closely aligned with successful historical outcomes, thereby improving future performance.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2A:
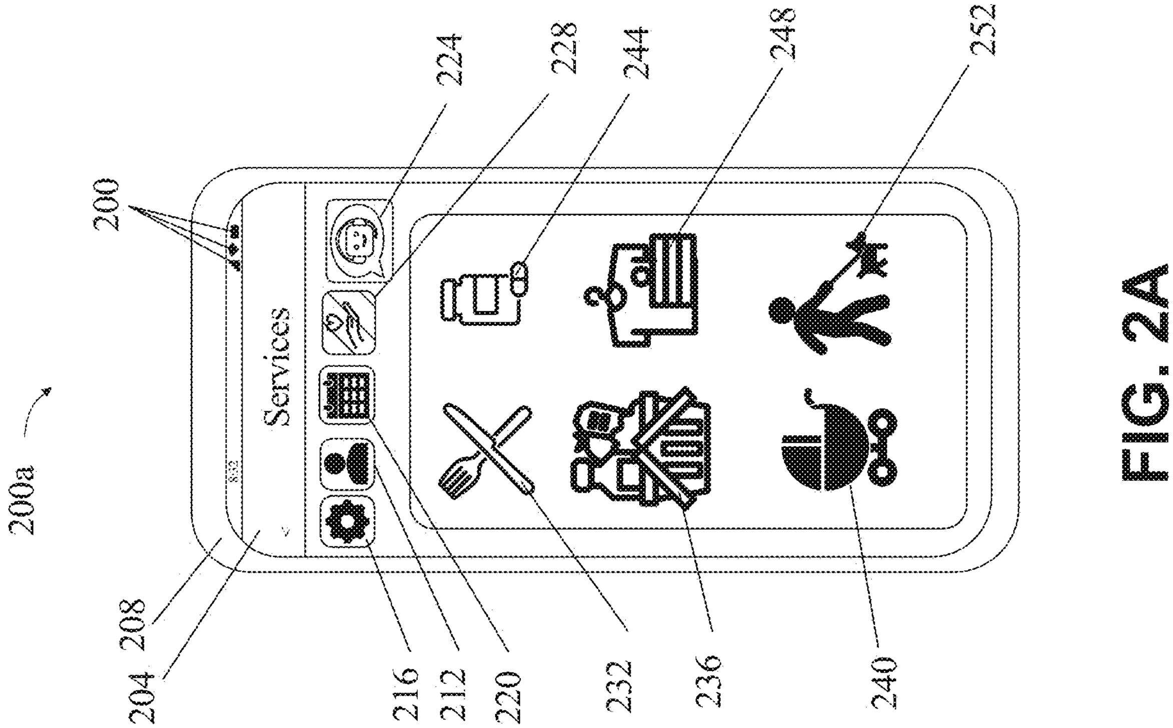
FIG. 2A is an exemplary illustration of a graphical user interface.

Referring now to FIG. 2A, an exemplary illustration 200*a* of a graphical user interface. In an embodiment, the graphical user interface 204 may be displayed on a downstream device 208. In an embodiment, the downstream device 208 may include a smartphone, tablet, or computer. In an embodiment, the GUI 204 may include a user profile icon 212. In an embodiment, the user profile icon 212 may serve as an interactive element that allows users to access and manage their personal account settings. In an embodiment, the user profile icon 212 may provide a direct link to the user's profile, where they may update personal information, review activity history, and configure preferences related to their interactions within the system. In an embodiment, the user profile icon 212 may enable users to modify details such as their name, contact information, medical history, or security settings. In an embodiment, the user profile icon 212 may serve as a gateway to account-related features, including login credentials, privacy controls, and system permissions. In an embodiment, the user profile icon 212 may support multi-user functionality, allowing different users to switch profiles or customize their experience within the same system. In an embodiment, the user profile icon 212 may incorporate a visual indicator, such as a profile picture placeholder, initials, or a silhouette, providing a recognizable representation of the user. In an embodiment, the user profile icon 212 may include a notification badge, alerting users to profile-related updates, messages, or required actions. In an embodiment, the user profile icon 212 may facilitate seamless user management and personalization within the GUI 204.

In an embodiment, the GUI 204 may include a gear icon 216. The GUI 204 may incorporate a gear icon 216, which may provide access to system settings, allowing users to customize preferences, adjust configurations, or manage administrative controls. In an embodiment, the GUI 204 may include calendar icon 220. The calendar icon 220 may allow the user to view a calendar interface and select one or more preferred time windows for the requested task. The calendar icon 220 may be used to schedule specific dates and times, modify existing bookings, or view system-generated availability options based on real-time data from entities and resources. In an embodiment, the GUI 204 may include chatbot icon 224. In an embodiment, the chatbot icon 224 may open an interactive assistant that communicates with the user to provide guidance, request additional information, or respond to questions in real time. The chatbot icon 224 may support both text and voice input and may be used to refine a user request, explain system outputs, or suggest alternatives when a match is declined. In an embodiment, the GUI 204 may include service selection 228. In an embodiment, the service selection 228 may present the user with a list or menu of available categories corresponding to the function datum. The service selection 228 may enable the user to choose from various task types such as cleaning, tutoring, delivery, or care-based options, allowing the system to interpret and process the function request accurately. In an embodiment, the GUI 204 may include fast food icon 232. In an embodiment, the fast food icon 232 may allow the user to initiate a request related to ordering or scheduling fast food delivery. The fast food icon 232 may streamline the selection of restaurant options, delivery time slots, and preferred menu items. In an embodiment, the GUI 204 may include grocery icon 236. In an embodiment, the grocery icon 236 may allow the user to request grocery shopping or delivery services. The grocery icon 236 may link to additional preferences such as store selection, product lists, or reusable shopping instructions based on prior behavior. In an embodiment, the GUI 204 may include child care services icon 240. In an embodiment, the child care services icon 240 may allow the user to request a babysitter, nanny, or other child care resource. The child care services icon 240 may surface parameters such as age range, certification requirements, and preferred care duration. In an embodiment, the GUI 204 may include medication icon 244. In an embodiment, the medication icon 244 may allow the user to request support related to pharmacy pickup, prescription delivery, or medication reminders. The medication icon 244 may prompt the user to enter timing details, pharmacy names, or prescription types for accurate matching. In an embodiment, the GUI 204 may include laundry icon 248. In an embodiment, the laundry icon 248 may allow the user to request pickup and drop-off laundry services, dry cleaning, or self-service reservations. The laundry icon 248 may present options for service types, turnaround time, and detergent preferences. In an embodiment, the GUI 204 may include dogwalker icon 252. In an embodiment, the dogwalker icon 252 may allow the user to request a dog walking task. The dogwalker icon 252 may provide inputs for pet size, walk duration, frequency, and availability windows to ensure appropriate resource matching.

Figure 2B:
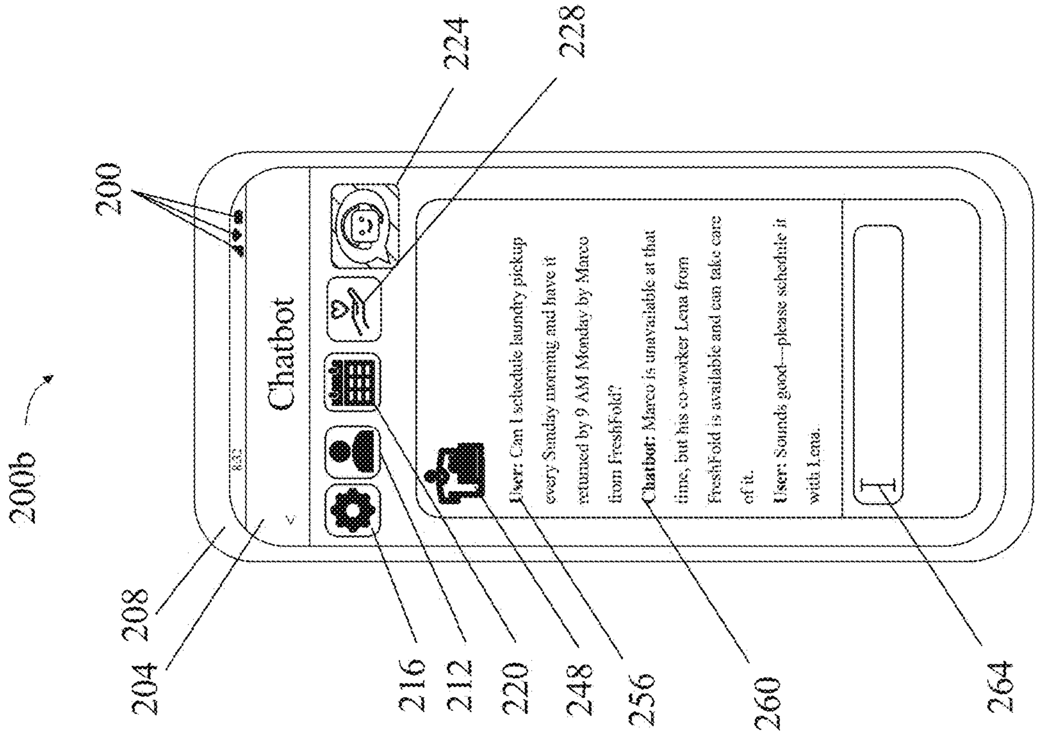
FIG. 2B is an exemplary illustration of a graphical user interface.

FIG. 2B is an exemplary illustration 200*b* of a graphical user interface. In an embodiment, the GUI 204 may include a user input 256. As used in this disclosure, a "user input" is any element, mechanism, or interface within a graphical user interface (GUI) that enables a user to convey data. The data may include instructions, preferences, and/or selections. In an embodiment, the user input 256 may include but is not limited to text entry, button selections, voice commands, or gesture-based interactions. In a non-limiting example, the user input 256 may include the text, "Can I schedule laundry pickup every Sunday morning and have it returned by 9 AM Monday by Marco from FreshFold?" into a scheduling app's messaging box, triggering the system to process a recurring service request. The user input 256 may include a request of the at least a user interaction as described herein.

In an embodiment, the GUI 204 may include a chatbot response 260. As used in this disclosure, a "chatbot response" is system-generated output presented within a graphical user interface (GUI). In an embodiment, the chatbot response 260 may reflect the processing of user input 256 by an automated conversational agent, which may include natural language replies, follow-up questions, suggestions, links, media, or other information intended to simulate or facilitate human-like interaction or guidance. For example, without limitation, in response to the user input 256 "Can I schedule laundry pickup every Sunday morning and have it returned by 9 AM Monday by Marco from FreshFold?", the chatbot displays the chatbot response 260: "Marco is unavailable at that time, but Lena from FreshFold is available and can take care of it. The chatbot response 260 may be generatedusing at least an output model comprising a machine learning model trained using reinforcement learning, a first output of a plurality of outputs based on one or more of the user profile, the first request, and the entity data as described herein.

In an embodiment, the GUI 204 may include an input field 264. As used in this disclosure, an "input field" is an interactive space within a graphical user interface designed to receive input from a user. In an embodiment, the input from the user may include, without limitation, characters, numbers, commands, images, recordings, or other data types, which may trigger a local or remote processing action, communication, or update within the application or system. The input field may be a single-line text box displayed at the bottom of a chat interface labeled "Type your message . . . " where the user enters "Can I schedule laundry pickup every Sunday morning and have it returned by 9 AM Monday by Marco from FreshFold?" In an embodiment, the input field 264 may include placeholder text such as "Ask a question or request a service . . . " and may support auto-suggestions or text prediction features. The input field 264 may be embedded in a mobile app with a microphone icon, allowing the user to speak the same phrase, which is then transcribed and submitted. The input field 264 may be styled with rounded borders, a soft shadow, and integrated send button to provide a user-friendly and intuitive experience.

Figure 3:
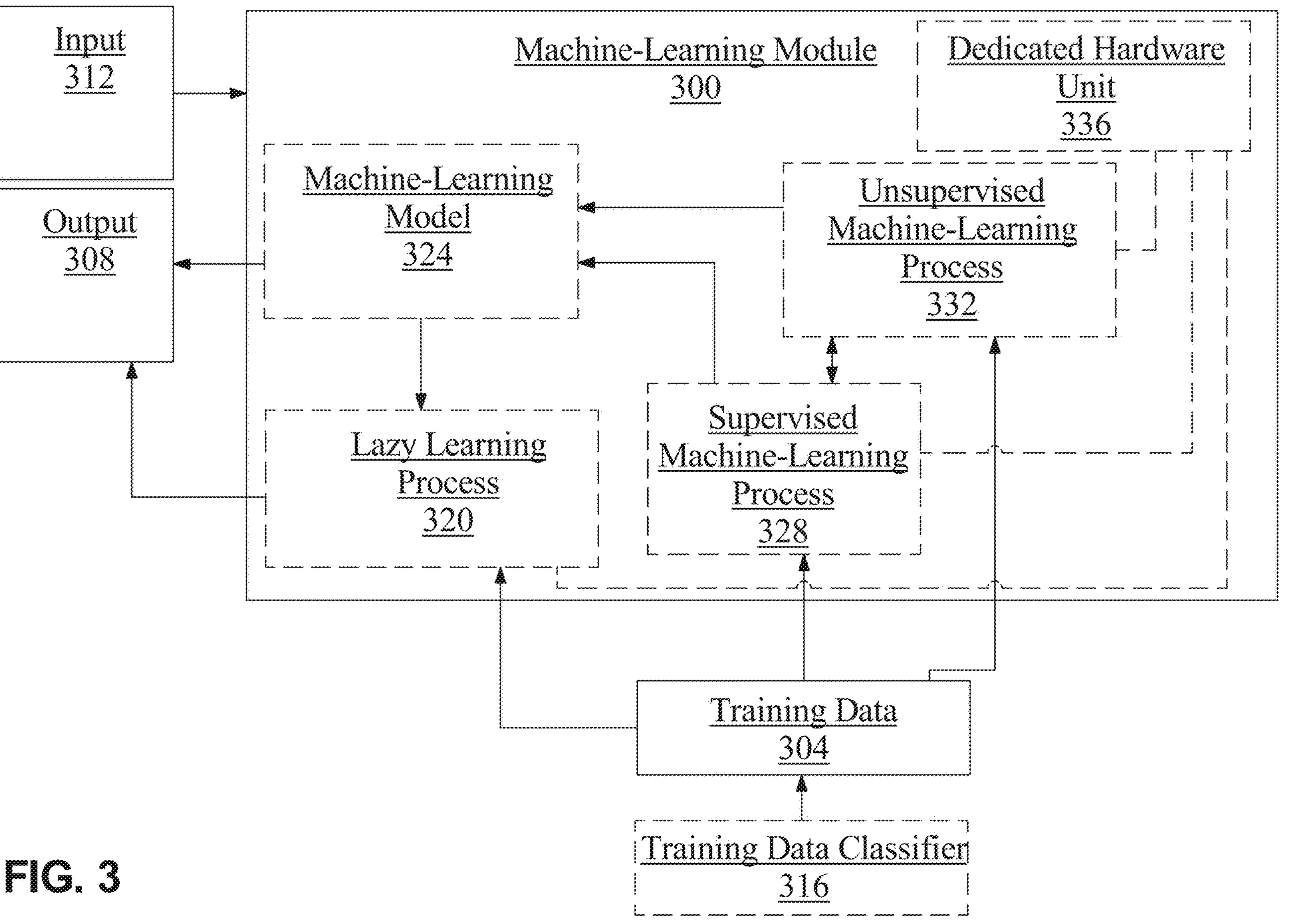
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs including user data, entity data, and at least a user interaction, and output plurality of outputs.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to preference clusters, behavioral segments, usage frequency bands, geographic locales, or time-of-day interaction patterns that characterize a subpopulation, such as a cohort of persons and/or other analyzed items and/or phenomena for which a subset of training data may be selected.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P (A/B)=P (B/A) P (A)=P (B), where P (A/B) is the probability of hypothesis A given data B also known as posterior probability; P (B/A) is the probability of data B given that the hypothesis A was true; P (A) is the probability of hypothesis A being true regardless of data also known as prior probability of A; and P (B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $X_{max}$:

$$X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the 25th percentile value and the 50th percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include user data, entity data, and at least an interaction as described above as inputs, plurality of outputs as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
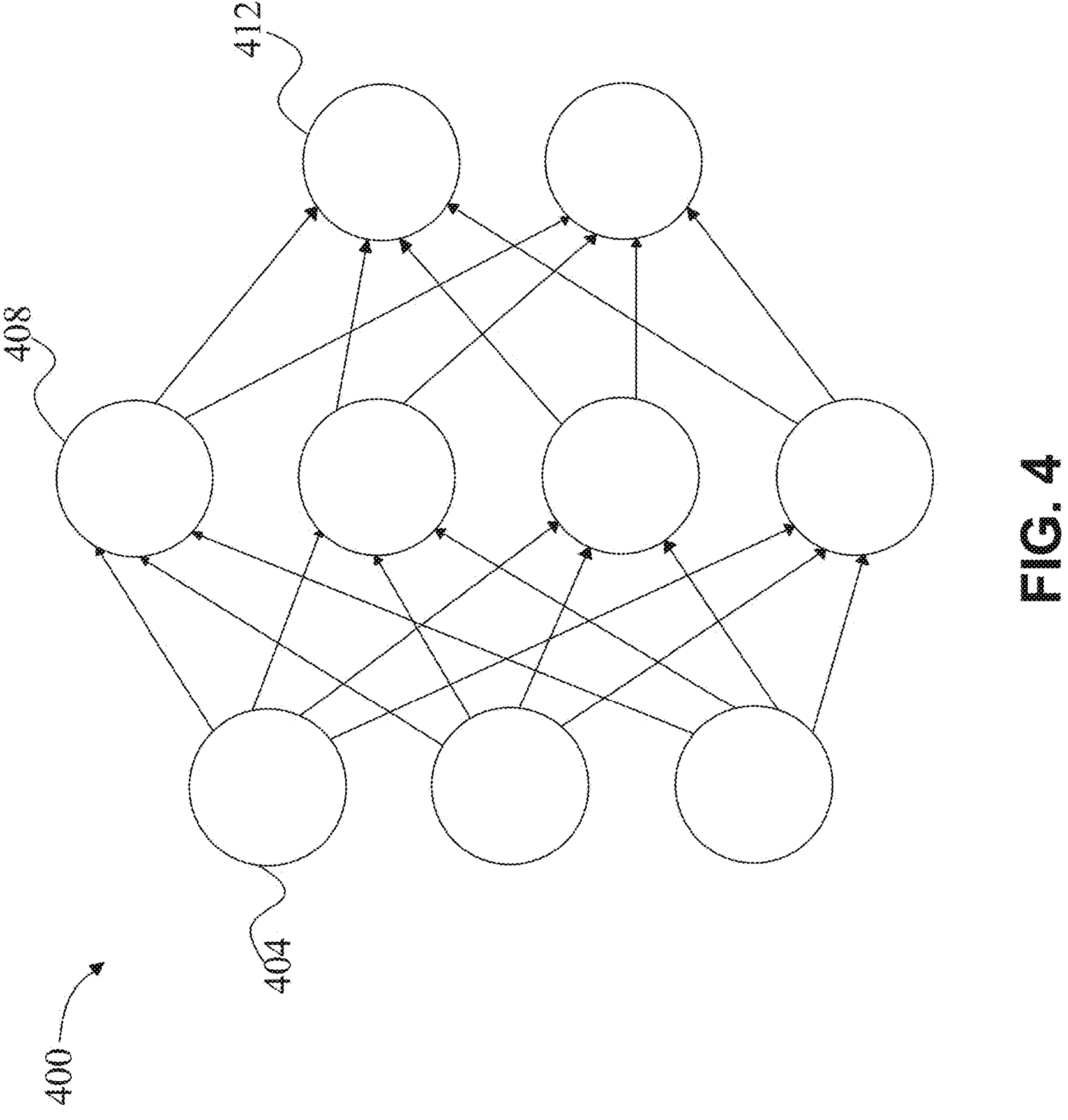
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
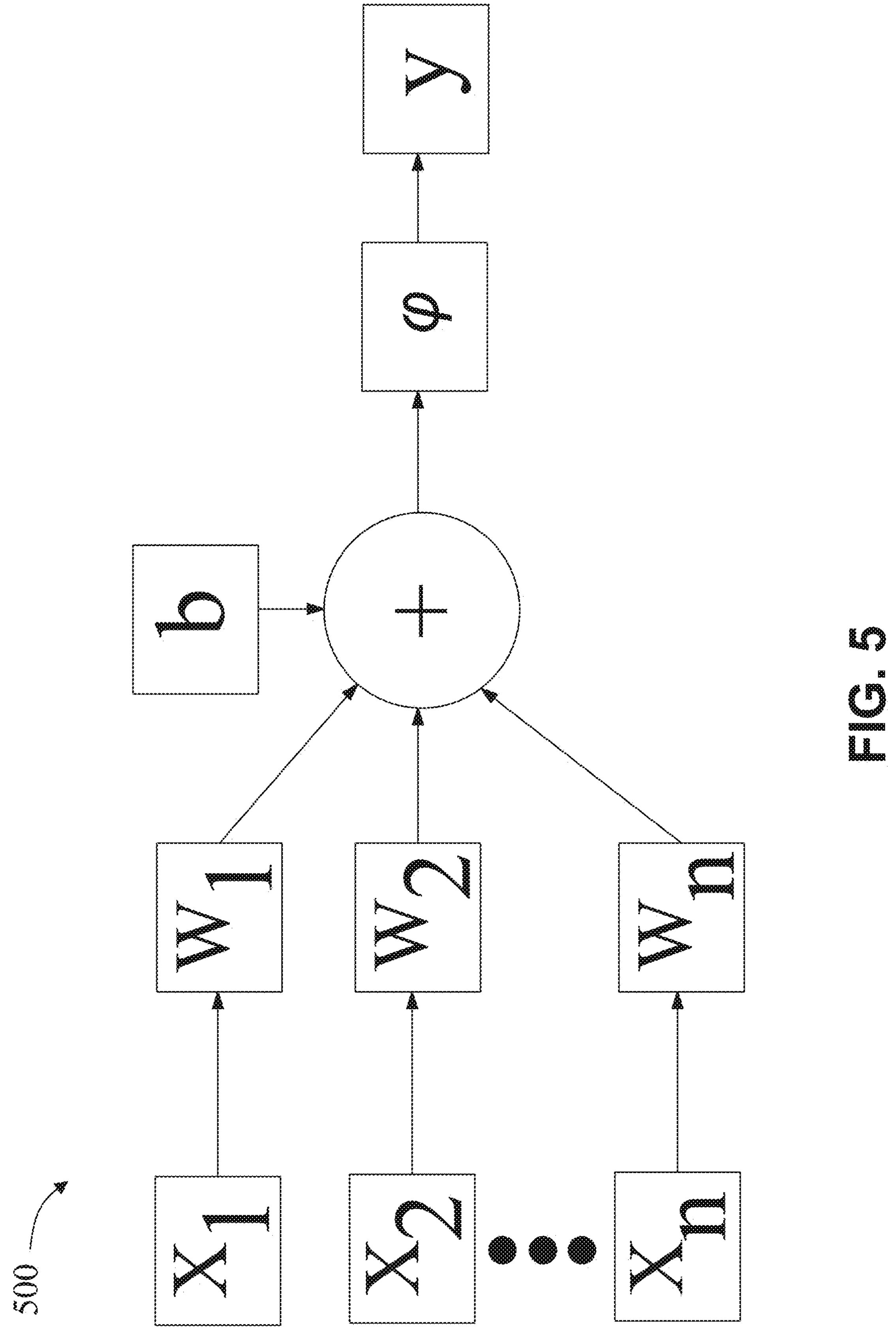
FIG. 5 is a diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}}$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
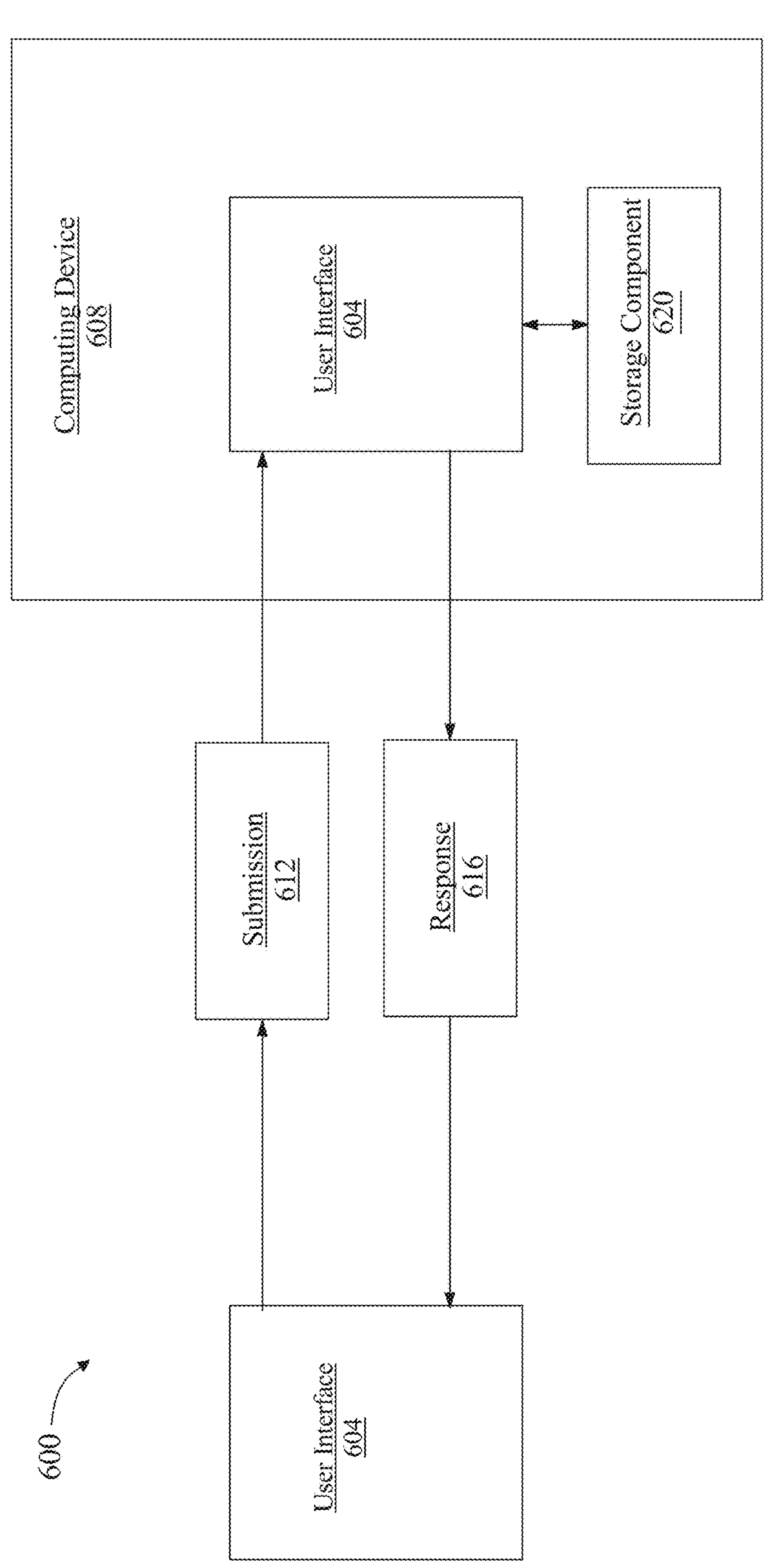
FIG. 6 is a diagram of an exemplary embodiment of a chatbot.

Referring to FIG. 6, a chatbot system 600 is schematically illustrated. According to some embodiments, a user interface 604 may be communicative with a computing device 608 that is configured to operate a chatbot. In some cases, user interface 604 may be local to computing device 608. Alternatively or additionally, in some cases, user interface 604 may remote to computing device 608 and communicative with the computing device 608, by way of one or more networks, such as without limitation the internet. Alternatively or additionally, user interface 604 may communicate with user device 608 using telephonic devices and networks, such as without limitation fax machines, short message service (SMS), or multimedia message service (MMS). Commonly, user interface 604 communicates with computing device 608 using text-based communication, for example without limitation using a character encoding protocol, such as American Standard for Information Interchange (ASCII). Typically, a user interface 604 conversationally interfaces a chatbot, by way of at least a submission 612, from the user interface 608 to the chatbot, and a response 616, from the chatbot to the user interface 604. In many cases, one or both submission 612 and response 616 are text-based communication. Alternatively or additionally, in some cases, one or both of submission 612 and response 616 are audio-based communication.

Continuing in reference to FIG. 6, a submission 612 once received by computing device 608 operating a chatbot, may be processed by a processor 620. In some embodiments, processor 620 processes submission 612 using one or more of keyword recognition, pattern matching, and natural language processing. In some embodiments, processor employs real-time learning with evolutionary algorithms. In some cases, processor 620 may retrieve a pre-prepared response from at least a storage component 620, based upon submission 612. Alternatively or additionally, in some embodiments, processor 620 communicates a response 616 without first receiving a submission 612, thereby initiating conversation. In some cases, processor 620 communicates an inquiry to user interface 604; and the processor is configured to process an answer to the inquiry in a following submission 612 from the user interface 604. In some cases, an answer to an inquiry present within submission 612 from a user device 604 may be used by computing device 608 as an input to another function.

Figure 7:
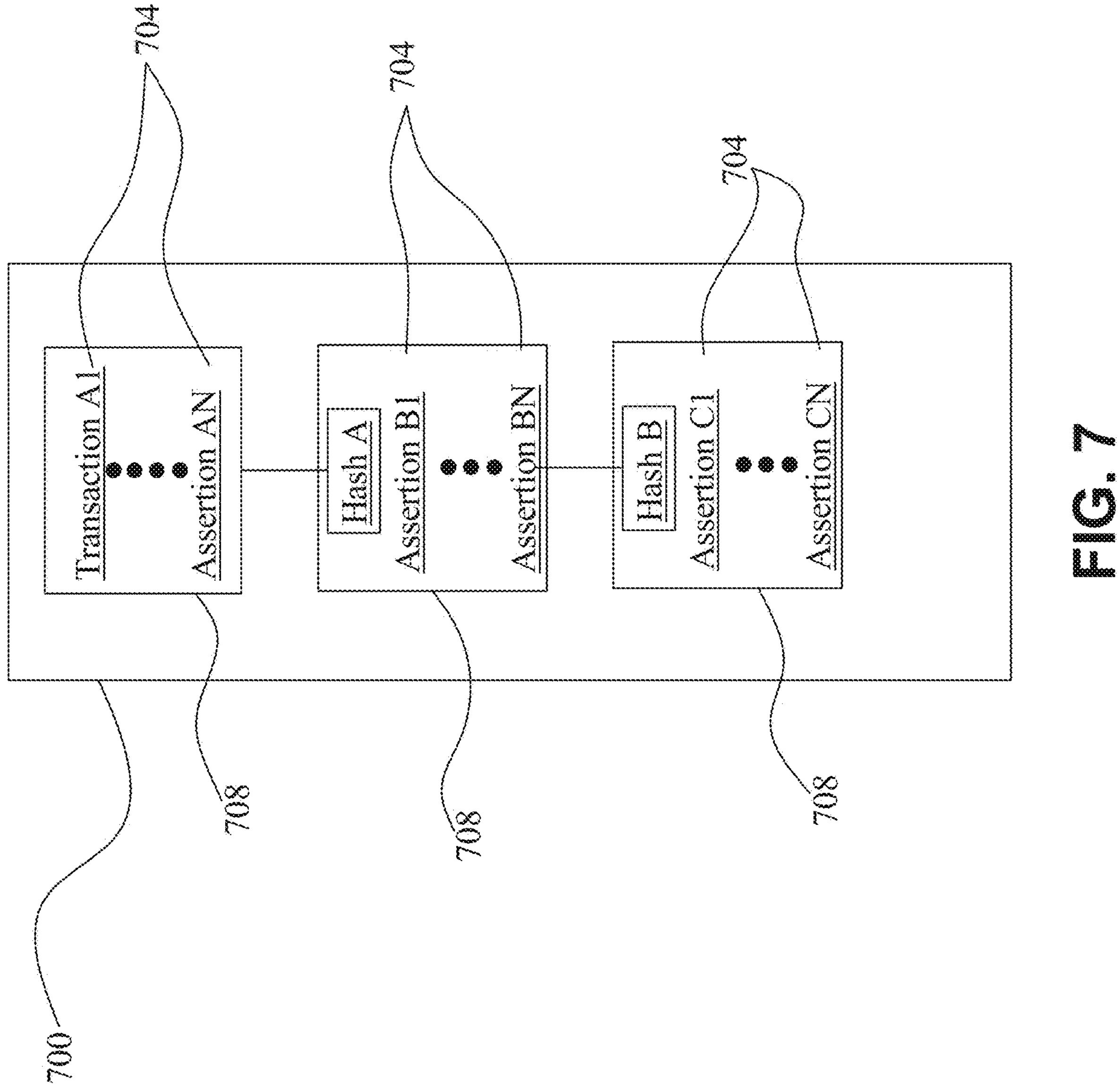
FIG. 7 is an exemplary embodiment of an immutable sequential listing.

Referring now to FIG. 7, an exemplary embodiment of an immutable sequential listing 700 is illustrated. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

Data elements are listed in immutable sequential listing 700; data elements may include any form of data, including textual data, image data, encrypted data, cryptographically hashed data, and the like. Data elements may include, without limitation, one or more at least a digitally signed assertions. In one embodiment, a digitally signed assertion 704 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 704. In an embodiment, collection of textual data states that the owner of a certain transferable item represented in a digitally signed assertion 704 register is transferring that item to the owner of an address. A digitally signed assertion 704 may be signed by a digital signature created using the private key associated with the owner's public key, as described above.

Still referring to FIG. 7, a digitally signed assertion 704 may describe a transfer of virtual currency, such as crypto-currency as described below. The virtual currency may be a digital currency. Item of value may be a transfer of trust, for instance represented by a statement vouching for the identity or trustworthiness of the first entity 164. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g., a ride share vehicle or any other asset. A digitally signed assertion 704 may describe the transfer of a physical good; for instance, a digitally signed assertion 704 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 704 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 7, in one embodiment, an address is a textual datum identifying the recipient of virtual currency or another item of value in a digitally signed assertion 704. In some embodiments, address is linked to a public key, the corresponding private key of which is owned by the recipient of a digitally signed assertion 704. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 704 may record a subsequent a digitally signed assertion 704 transferring some or all of the value transferred in the first a digitally signed assertion 704 to a new address in the same manner. A digitally signed assertion 704 may contain textual information that is not a transfer of some item of value in addition to, or as an alternative to, such a transfer. For instance, as described in further detail below, a digitally signed assertion 704 may indicate a confidence level associated with a distributed storage node as described in further detail below.

In an embodiment, and still referring to FIG. 7 immutable sequential listing 1XX records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 700 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 7, immutable sequential listing 700 may preserve the order in which the at least a posted content took place by listing them in chronological order; alternatively or additionally, immutable sequential listing 700 may organize digitally signed assertions 704 into sub-listings 708 such as "blocks" in a blockchain, which may be themselves collected in a temporally sequential order; digitally signed assertions 704 within a sub-listing 708 may or may not be temporally sequential. The ledger may preserve the order in which at least a posted content took place by listing them in sub-listings 708 and placing the sub-listings 708 in chronological order. The immutable sequential listing 700 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 700 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 7, immutable sequential listing 700, once formed, may be inalterable by any party, no matter what access rights that party possesses. For instance, immutable sequential listing 700 may include a hash chain, in which data is added during a successive hashing process to ensure non-repudiation. Immutable sequential listing 700 may include a block chain. In one embodiment, a block chain is immutable sequential listing 700 that records one or more new at least a posted content in a data item known as a sub-listing 708 or "block." An example of a block chain is the BITCOIN block chain used to record BITCOIN transactions and values. Sub-listings 708 may be created in a way that places the sub-listings 708 in chronological order and link each sub-listing 708 to a previous sub-listing 708 in the chronological order so that any computing device may traverse the sub-listings 708 in reverse chronological order to verify any at least a posted content listed in the block chain. Each new sub-listing 708 may be required to contain a cryptographic hash describing the previous sub-listing 708. In some embodiments, the block chain contains a single first sub-listing 708 sometimes known as a "genesis block."

Still referring to FIG. 7, the creation of a new sub-listing 708 may be computationally expensive; for instance, the creation of a new sub-listing 708 may be designed by a "proof of work" protocol accepted by all participants in forming the immutable sequential listing 700 to take a powerful set of computing devices a certain period of time to produce. Where one sub-listing 708 takes less time for a given set of computing devices to produce the sub-listing 708 protocol may adjust the algorithm to produce the next sub-listing 708 so that it will require more steps; where one sub-listing 708 takes more time for a given set of computing devices to produce the sub-listing 708 protocol may adjust the algorithm to produce the next sub-listing 708 so that it will require fewer steps. As an example, protocol may require a new sub-listing 708 to contain a cryptographic hash describing its contents; the cryptographic hash may be required to satisfy a mathematical condition, achieved by having the sub-listing 708 contain a number, called a nonce, whose value is determined after the fact by the discovery of the hash that satisfies the mathematical condition. Continuing the example, the protocol may be able to adjust the mathematical condition so that the discovery of the hash describing a sub-listing 708 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 708 according to the protocol is known as "mining." The creation of a new sub-listing 708 may be designed by a "proof of stake" protocol as will be apparent to those skilled in the art upon reviewing the entirety of this disclosure.

Continuing to refer to FIG. 7, in some embodiments, protocol also creates an incentive to mine new sub-listings 708. The incentive may be financial; for instance, successfully mining a new sub-listing 708 may result in the person or entity that mines the sub-listing 708 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 708 Each sub-listing 708 created in immutable sequential listing 700 may contain a record or at least a posted content describing one or more addresses that receive an incentive, such as virtual currency, as the result of successfully mining the sub-listing 708.

With continued reference to FIG. 7, where two entities simultaneously create new sub-listings 708, immutable sequential listing 700 may develop a fork; protocol may determine which of the two alternate branches in the fork is the valid new portion of the immutable sequential listing 700 by evaluating, after a certain amount of time has passed, which branch is longer. "Length" may be measured according to the number of sub-listings 708 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 708 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 700 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 700.

Still referring to FIG. 7, additional data linked to at least a posted content may be incorporated in sub-listings 708 in the immutable sequential listing 700; for instance, data may be incorporated in one or more fields recognized by block chain protocols that permit a person or computer forming a at least a posted content to insert additional data in the immutable sequential listing 700. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 7, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 708 in a block chain computationally challenging; the incentive for producing sub-listings 708 may include the grant of new crypto-currency to the miners. Quantities of crypto-currency may be exchanged using at least a posted content as described above.

Figure 8:
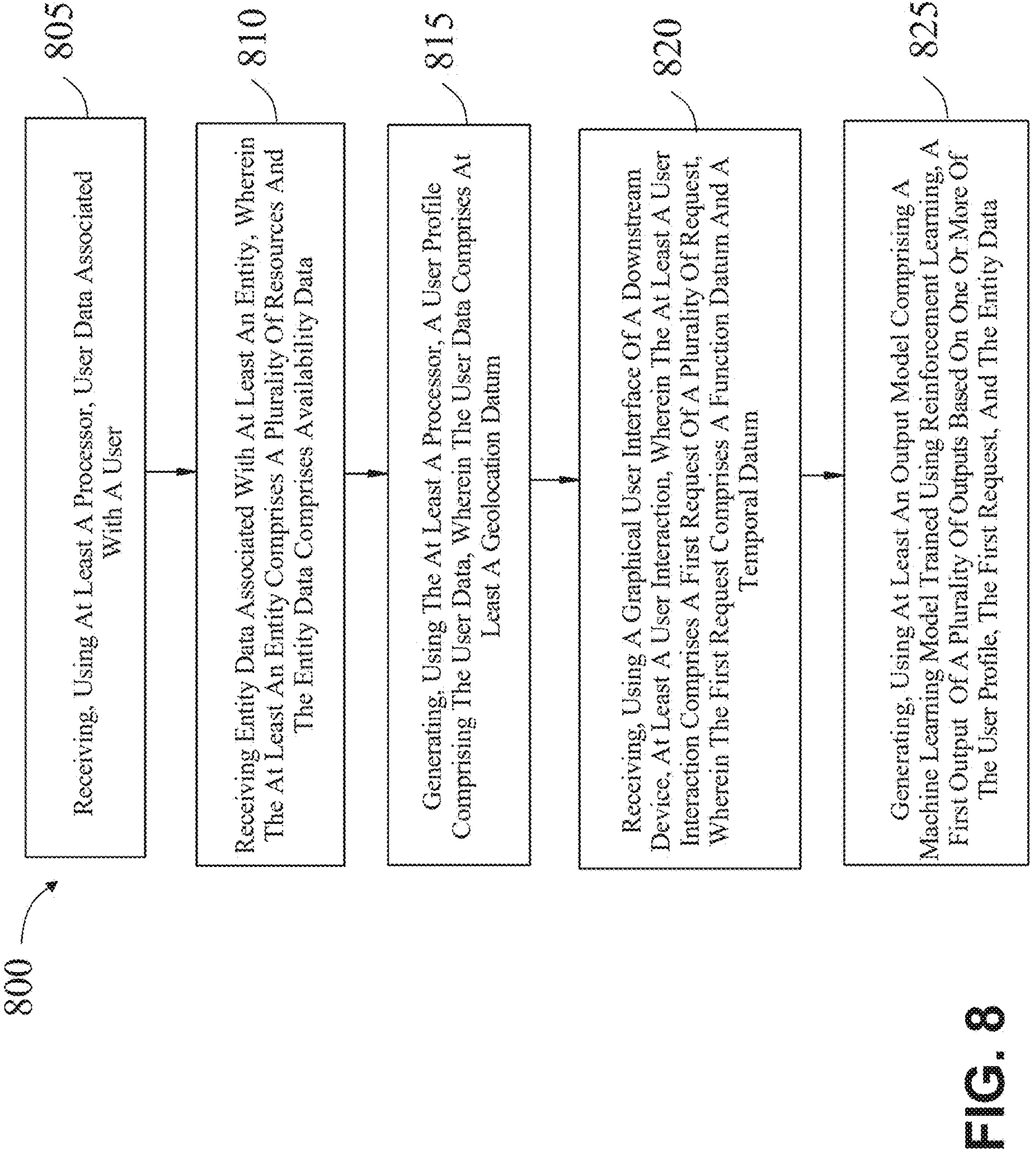
FIG. 8 is a block diagram of an exemplary method for generating a personalized output as a function of a user profile and at least a user interaction.

Referring now to FIG. 8, a flow diagram of an exemplary method 800 for generating a personalized output as a function of a user profile and at least a user interaction is illustrated. At step 805, method 800 includes receiving, using at least a processor, user data associated with a user. This may be implemented as described and with reference to FIGS. 1-5.

Still referring to FIG. 8, at step 810, method 800 includes receiving entity data associated with at least an entity, wherein the at least an entity comprises a plurality of resources and the entity data comprises availability data. This may be implemented as described and with reference to FIGS. 1-5.

Still referring to FIG. 8, at step 815, method 800 includes generating, using the at least a processor, a user profile comprising the user data, wherein the user data comprises at least a geolocation datum. This may be implemented as described and with reference to FIGS. 1-5.

Still referring to FIG. 8, at step 820, method 800 includes receiving, using a graphical user interface of a downstream device, at least a user interaction, wherein the at least a user interaction comprises a first request of a plurality of requests, wherein the first request comprises a function datum and a temporal datum. This may be implemented as described and with reference to FIGS. 1-5.

Still referring to FIG. 8, at step 825, method 800 includes generating, using at least an output model comprising a machine learning model trained using reinforcement learning, a first output of a plurality of outputs based on one or more of the user profile, the first request, and the entity data. This may be implemented as described and with reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory “ROM” device, a random access memory “RAM” device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
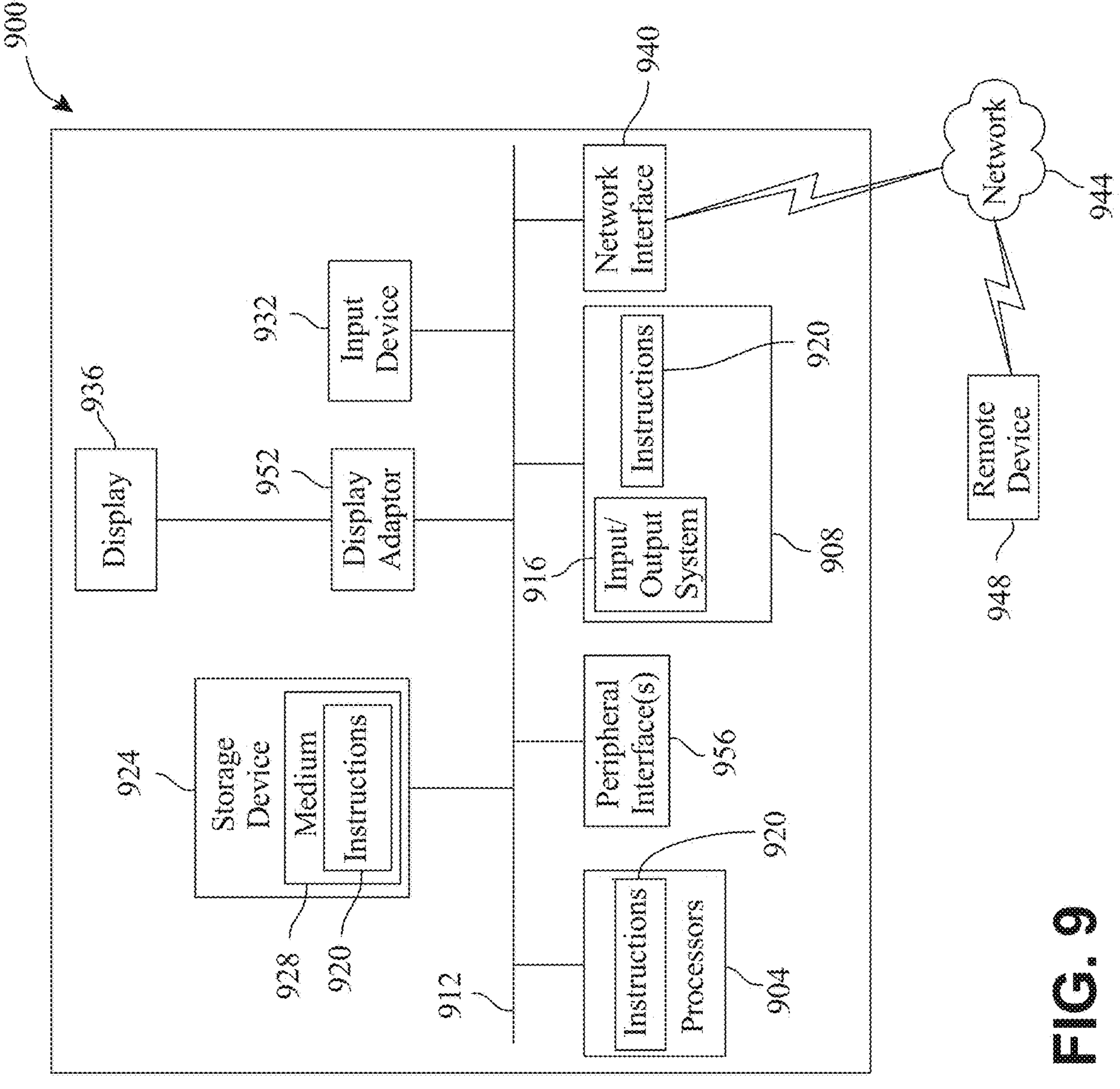
FIG. 9 is a block diagram of a computing system that can be used to implement any one or more of the methodologies disclosed herein and any one or more portions thereof.

FIG. 9 shows a diagrammatic representation of one embodiment of computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display device 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating a personalized output as a function of a user profile and at least a user interaction, wherein the apparatus comprises:

at least a computing device, wherein the computing device comprises:

a memory; and at least a processor communicatively connected to the memory, wherein the memory contains instructions configuring the at least a processor to:

receive, using the at least a processor, user data associated with a user;

receive entity data associated with at least an entity, wherein the at least an entity comprises a plurality of resources, and wherein the entity data comprises one or more preference indicators attributing to flexible conditions for a first service provider to deviate from standard service acceptance workflows;

generate, using the at least a processor, a user profile comprising the user data, wherein the user data comprises at least a geolocation datum;

receive, using a graphical user interface of a downstream device, at least a user interaction, wherein the at least a user interaction comprises a first request of a plurality of requests, wherein the first request comprises a function datum and a temporal datum; and generate, using at least an output model comprising a machine learning model trained using reinforcement learning, a first output of a plurality of outputs based on one or more of the user profile, the first request, and the entity data, wherein the plurality of outputs further comprises a proposal of an alternative service provider based on the one or more preference indicators and the flexible conditions defined by the first service provider when the output model identifies a conflict of the first service provider.

2. The apparatus of claim 1, wherein training the machine learning model using reinforcement learning comprises:

receiving, by the machine learning model, a feedback signal corresponding to historical outputs; and adjusting, by the machine learning model, one or more parameters of the machine learning model based on a reward function, wherein the reward function optimizes alignment between the plurality of outputs associated with the feedback signal.

3. The apparatus of claim 2, wherein the reward function assigns a numerical reward value to the first output based on alignment between the first output and the feedback signal corresponding to one or more historical outputs.

4. The apparatus of claim 1, wherein the output model predicts a temporal interval associated with the first request based on the at least a geolocation datum of the at least an entity and historic temporal intervals associated with the at least an entity and the function datum.

5. The apparatus of claim 1, further comprising generating, using the at least an output model, a continuation protocol, wherein the continuation protocol comprises one or more of an alternative resource, an alternative entity, and an alternative temporal datum associated with the function of the first request.

6. The apparatus of claim 1, wherein generating the first output comprises:

extracting, using the at least an output model, a category corresponding to the function of the at least an entity and a temporal datum of the first request;

comparing, using the at least an output model, a first entity with a second entity of the at least an entity based on the category, the temporal datum corresponding to an availability datum associated each entity of the at least an entity, and the at least a geolocation datum of the user profile corresponding to the at least a geolocation datum of the at least an entity;

generating, using the at least an output model, a score for the first entity and the second entity as a function of a comparison; and generating, the first output as a function of the score.

7. The apparatus of claim 1, further comprising generating, using the at least an output model, one or more additional outputs as a function of a rejection datum of the at least a user interaction, wherein the rejection datum is in response to the first output.

8. The apparatus of claim 1, further comprising a chatbot, wherein the chatbot:

receives one or more of the user data and the at least a user interaction; and generates a response based on a context of the at least a user interaction, wherein the response provides a request for additional information.

9. The apparatus of claim 1, further comprising a real-time notification system, wherein the real-time notification system comprises transmitting, using the at least a processor, a notification to the downstream device, wherein the notification comprises at least an alert corresponding to historical user interactions.

10. The apparatus of claim 1, further comprising an immutable sequence listing, wherein the immutable sequence listing comprises logging the at least a user interaction corresponding to the plurality of outputs.

11. A method for generating a personalized output as a function of a user profile and at least a user interaction, wherein the method comprises:

receiving, using at least a processor, user data associated with a user;

receiving entity data associated with at least an entity, wherein the at least an entity comprises a plurality of resources, and wherein the entity data comprises one or more preference indicators attributing to flexible conditions for a first service provider to deviate from standard service acceptance workflows;

generating, using the at least a processor, a user profile comprising the user data, wherein the user data comprises at least a geolocation datum;

receiving, using a graphical user interface of a downstream device, at least a user interaction, wherein the at least a user interaction comprises a first request of a plurality of requests, wherein the first request comprises a function datum and a temporal datum; and generating, using at least an output model comprising a machine learning model trained using reinforcement learning, a first output of a plurality of outputs based on one or more of the user profile, the first request, and the entity data, wherein the plurality of outputs further comprises a proposal of an alternative service provider based on the one or more preference indicators and the flexible conditions defined by the first service provider when the output model identifies a conflict of the first service provider.

12. The method of claim 11, wherein training the machine learning model using reinforcement learning comprises:

receiving, by the machine learning model, a feedback signal corresponding to historical outputs; and adjusting, by the machine learning model, one or more parameters of the machine learning model based on a reward function, wherein the reward function optimizes alignment between the plurality of outputs associated with the feedback signal.

13. The method of claim 12, further comprising, assigning, using the reward function, a numerical reward value to the first output based on alignment between the first output and the feedback signal corresponding to one or more historical outputs.

14. The method of claim 11, further comprising predicting, using the output model, a temporal interval associated with the first request based on the at least a geolocation datum of the at least an entity and historic temporal intervals associated with the at least an entity and the function datum.

15. The method of claim 11, further comprising generating, using the at least an output model, a continuation protocol, wherein the continuation protocol comprises one or more of an alternative resource, an alternative entity, and an alternative temporal datum associated with the function of the first request.

16. The method of claim 11, wherein generating the first output comprises:

extracting, using the at least an output model, a category corresponding to the function of the at least an entity and a temporal datum of the first request;

comparing, using the at least an output model, a first entity with a second entity of the at least an entity based on the category, the temporal datum corresponding to an availability datum associated each entity of the at least an entity, and the at least a geolocation datum of the user profile corresponding to the at least a geolocation datum of the at least an entity;

generating, using the at least an output model, a score for the first entity and the second entity as a function of a comparison; and generating, the first output as a function of the score.

17. The method of claim 11, further comprising generating, using the at least an output model, one or more additional outputs as a function of a rejection datum of the at least a user interaction, wherein the rejection datum is in response to the first output.

18. The method of claim 11, further comprising a chatbot, wherein the chatbot:

receives one or more of the user data and the at least a user interaction; and generates a response based on a context of the at least a user interaction, wherein the response provides a request for additional information.

19. The method of claim 11, further comprising a real-time notification system, wherein the real-time notification system comprises transmitting, using the at least a processor, a notification to the downstream device, wherein the notification comprises at least an alert corresponding to historical user interactions.

20. The method of claim 11, further comprising an immutable sequence listing, wherein the immutable sequence listing comprises logging the at least a user interaction corresponding to the plurality of outputs.

* * * * *